US006681034B1

(12) United States Patent
Russo

(10) Patent No.: US 6,681,034 B1
(45) Date of Patent: Jan. 20, 2004

(54) METHOD AND SYSTEM FOR FINGERPRINT TEMPLATE MATCHING

(75) Inventor: Anthony P. Russo, New York, NY (US)

(73) Assignee: Precise Biometrics, Lund (SE)

( * ) Notice: Subject to any disclaimer, the term of this patent is extended or adjusted under 35 U.S.C. 154(b) by 0 days.

(21) Appl. No.: 09/354,929

(22) Filed: Jul. 15, 1999

(51) Int. Cl.⁷ .................................. G06K 9/00
(52) U.S. Cl. .......................... 382/125; 902/6
(58) Field of Search .................. 382/124, 125, 382/126, 127; 340/5.53, 5.83; 902/26, 3, 6

(56) References Cited

U.S. PATENT DOCUMENTS

| 4,135,147 A |   | 1/1979  | Riganati et al. | 340/146.3 |
|-------------|---|---------|----------------|-----------|
| 4,151,512 A |   | 4/1979  | Riganati et al. | 340/146.3 |
| 4,185,270 A |   | 1/1980  | Fischer, II et al. | 340/146.3 |
| 4,438,824 A |   | 3/1984  | Mueller-Schloer | 178/22.08 |
| 4,532,508 A |   | 7/1985  | Ruell | 340/825.34 |
| 4,582,985 A |   | 4/1986  | Löfberg | 235/380 |
| 4,646,352 A |   | 2/1987  | Asai et al. | 682/5 |
| 4,783,823 A | * | 11/1988 | Tasaki et al. | 382/4 |
| 4,993,068 A |   | 2/1991  | Piosenka et al. | 380/23 |
| 5,144,680 A |   | 9/1992  | Kobayashi et al. | 382/4 |
| 5,268,963 A |   | 12/1993 | Monroe et al. | 380/23 |
| 5,280,527 A | * | 1/1994  | Gullman et al. | 382/23 |
| 5,384,846 A | * | 1/1995  | Berson et al. | 380/23 |
| 5,450,491 A |   | 9/1995  | McNair | 380/25 |
| 5,469,506 A | * | 11/1995 | Berson et al. | 380/23 |
| 5,509,083 A | * | 4/1996  | Abtahi et al. | 82/124 |
| 5,541,994 A |   | 7/1996  | Tomko et al. | 380/30 |
| 5,559,504 A |   | 9/1996  | Itsumi et al. | 340/825.3 |
| 5,581,630 A | * | 12/1996 | Bonneau, Jr. | 382/116 |
| 5,613,012 A | * | 3/1997  | Hoffman et al. | 382/115 |

FOREIGN PATENT DOCUMENTS

| EP | 0 050 842 A2 | 10/1981 | G06K/9/68 |
| EP | 0050842 A2 | 5/1982 | G06K/9/68 |
| EP | 0 159 037 A2 | 4/1985 | G07C/9/00 |

(List continued on next page.)

OTHER PUBLICATIONS

National Semiconductor Corporation, CMOS Databook, 1984, pp. 2, 3 & 9–3.*

(List continued on next page.)

Primary Examiner—Brian Werner
(74) Attorney, Agent, or Firm—Burns, Doane, Swecker & Mathis, L.L.P.

(57) ABSTRACT

A method for matching templates and a system thereof. Each template includes a plurality of data chunks, each data chunk representing a minutia and comprising a location, a minutia angle and a neighborhood. The location is represented by two coordinates. In one embodiment, each coordinate and the minutia angle are quantized. The neighborhood includes positional parameters with respect to a selected minutia for a predetermined number of neighbor minutiae. In one embodiment, a neighborhood boundary is drawn around the selected minutia and neighbor minutiae are selected from the enclosed area. A reference template is compared to a measured template on a chunk-by-chunk basis. A chunk from each of the template is loaded into a random access memory (RAM). The location, minutia angle and neighborhood of the reference data chunk are compared with the location, minutia angle and neighborhood of the measured data chunk, respectively. In one embodiment, the comparison uses straight subtractions. If the differences for all the parameters meet their respective predetermined tolerances, the measured data chunk matches the reference data chunk. If the number of data chunk matches is equal to or is greater than a predetermined data chunk match rate, the measured template matches the reference template. The neighborhoods are compared by comparing each positional parameter. If all the positional parameters match, the neighbors match. If a predetermined number of neighbor matches is met, the neighborhoods match.

24 Claims, 15 Drawing Sheets

FOREIGN PATENT DOCUMENTS

| | | | | |
|---|---|---|---|---|
| EP | 0159037 A2 | 10/1985 | ............ | G07C/9/00 |
| EP | 0 513 612 A2 | 5/1992 | ............ | G06K/9/46 |
| EP | 0507319 A2 | 10/1992 | ............ | G06K/9/46 |
| EP | 0513612 A2 | 11/1992 | ............ | G06K/9/46 |
| EP | 0791889 A2 * | 8/1997 | ............ | G07C/9/00 |
| GB | 2 256 170 A | 5/1992 | ............ | G06K/9/00 |
| GB | 2256170 A | 12/1992 | ............ | G06K/9/00 |
| WO | WO 93/17388 A1 | 9/1993 | ............ | G06F/12/14 |

OTHER PUBLICATIONS

"Exclusive Use Equipment"; NEC Research & Development, JP, Nippon electric Ltd., Tokyo; No. 96, Mar. 1, 1990, pp. 143–159, Section '4.1 Automated Fingerprint Identification (AFIS)'.

"Automatic Fingerprint Verification System Digital Image Processing Algorithm"; Kim et al, Proceedings of the Region 10 Conference (TENCON), New York, IEEE, vol. Conf. 3, 1987, pp. 66–70; Section "5. Matching".

S. Anderson et al., "A Single Chip Sensor and Image Processor for Fingerprinting Verification", IEEE Custom Integrated Circuits Conference, pp. 12.1.1–12.1.4.

Kim et al., "Automatic Fingerprint Verification System Digital Image Processing Algorithm," *Proceedings Tencon 87, 1987 IEEE Region 10 Conference*, vol. 1: 66–70 (1987).

Nishiyama, "Exclusive Use Equipment" *NEC Res. and Develop. No. 96* 143–159 (1990).

"Biometric Access Control in a Personal Computer System", IBM Technical Disclosure Bulletin, vol. 41, No. 1, Jan. 1, 1998, pp. 753–756.

S. Pankanti et al., "Biometrics: The Future of Identification", *Computer*, Feb., 2000, vol. 33, No. 2, pp. 46–49.

P. Phillips et al., "An Introduction to Evaluating Biometric Systems", *Computer*, Feb., 2000. vol. 33, No. 2, pp. 56–63.

L. O'Gorman, "Practical Systems for Personal Fingerprint Authentication", *Computer*, Feb., 2000, vol. 33, No. 2, pp. 58–59.

* cited by examiner

FIG. 7A

FIG. 7B $N_i$: | $d_i$ | $\phi_i$ | $\varphi_i$ |

FIG. 7C $N'_i$: | $d'_i$ | $\phi'_i$ | $\varphi'_i$ |

FIG. 7D

METHOD AND SYSTEM FOR FINGERPRINT TEMPLATE MATCHING

CROSS REFERENCE TO APPENDIX

Appendix A, which is a part of the present disclosure, is a listing of software code for embodiments of components of this invention, which are described more completely below.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

This invention relates to fingerprint verification. More particularly, this invention relates to methods for matching fingerprint templates and structures thereof.

BACKGROUND OF THE INVENTION

Biometric identification is used to verify the identity of a person by digitally measuring selected features of some physical characteristic and comparing those measurements with those filed for the person in a reference database, or sometimes on a smart card carried by the person. Physical characteristics that are being used include fingerprints, voiceprints, the geometry of the hand, the pattern of blood vessels on the wrist and on the retina of the eye, the topography of the iris of the eye, facial patterns and the dynamics of writing a signature and typing on a keyboard.

The fingerprint is one of the most widely used physical characteristics in biometric identification. Fingerprints are utilized as the most reliable means to identify individuals because of two outstanding characteristics; namely that they remain unchanged all through life and differ from individual to individual. Fingerprints consist of raised friction ridges of skin separated by recessed valleys of skin. Fingerprint "minutiae" are conventionally defined as ridge endings or ridge bifurcations where a ridge splits into two ridges.

Since the matching of a fingerprint as an image can require large file capacity to store the measured and referenced features and complex computation to match measured features with reference features, fingerprint identification is carried out using the positional relationship of features or minutiae that are extracted from the fingerprint image. The minutiae representing a fingerprint image are digitized and stored in a digital memory, which may be a read-only memory, magnetic tape, or the like. A fingerprint digitized in this manner may be compared with reference fingerprints stored in the memory. For the comparison to work, the reference fingerprint and the measured fingerprint must be extracted, characterized, and digitized so that the fingerprint templates contain the same information and have the same format.

One application of fingerprint identification is to use the fingerprint to unlock a smart card which often contains encrypted information. Presently, a PIN (personal identification number) is required to be entered by the user before the encrypted information can be extracted from the smart card and used. The use of a PIN has many drawbacks. For example, the accounting or card issuing organization faces significant administrative cost in handling the secret codes and the card holders have to memorize the secret codes.

Some privacy laws, for example, the privacy laws in Europe, require sensitive information such as a reference fingerprint template to be stored on the smart card in a way that it cannot leave the card without first unlocking the card with a PIN. Therefore, for a fingerprint matching scheme to be practical in Europe, the fingerprint template matching algorithm must be executed by a microprocessor in the smart card. Otherwise, the smart card must be unlocked by some other mechanism, such as a PIN, before the reference fingerprint template can be read. The difficulty of executing conventional fingerprint template matching algorithm on a smart card is mainly due to the limited computational capabilities and memory of a conventional smart card. For example, a conventional smart card typically has less than 512 bytes of RAM (with 256 bytes being typical) and between 1 Kilobyte and 16 Kilobytes of memory. An 8-bit RISC (reduced instruction set computer) microprocessor has a speed between 1 MegaHertz to 10 MegaHertz which is quite slow given the magnitude of the computations required to complete a comparison between a measured fingerprint and a reference fingerprint. In effect, the hardware constraints prevent the use of fingerprint to unlock data from smart cards.

In addition to hardware constraints, another important design criterion is cost. U.S. Pat. No. 4,582,985 (hereinafter, the '985 patent) entitled "Data Carrier", issued Apr. 15, 1986, to BöLofberg and hereby incorporated by reference in its entirety, describes a data carrier of a card type. According to the '985 patent, the data carrier includes a fingerprint verification device for carrying out the verification process. The verification device includes a sensor device for sensing a finger tip of the owner and obtaining the corresponding finger print line information. A specialized smart card must be used to accommodate the sensor device since a conventional smart card does not provide such accommodations. In addition, since the fingerprint template generation, storage, and comparison are done at the data carrier, the microprocessor of a conventional smart card is not adequate. Hence, a specialized smart card having a more capable processor must be used, thereby increasing cost.

Therefore, what is needed are systems and fingerprint template matching algorithms that can be executed by a microprocessor with low memory and low computational capacities, thereby keeping the cost of the smart card at an acceptable level.

SUMMARY OF THE INVENTION

In accordance with the present invention, a smart card verification system and a fingerprint template matching algorithm are provided. The fingerprint template matching algorithm is capable of being executed by a microprocessor with low memory and low computational capacities.

In one embodiment of this invention, a reference fingerprint template and a measured fingerprint template are generated from a reference fingerprint image and a fingerprint image to be verified, respectively. Each template comprises a plurality of data chunks, each data chunk representing a minutia and comprising a location, a minutia angle and a neighborhood. In one embodiment, the location is represented by two coordinates ($x_j$, $y_j$), the coordinates having a center point (0,0) at the upper left hand corner. The minutia angle $\theta_j$ is the angle between the x-axis and a line tangential to the ridge line at the minutia. In one embodiment, each coordinate and the minutia angle are quantized to a selected number of bits. In general, the amount of quantization is a function of the available memory and the degree of accuracy desired.

The neighborhood is made up of a predetermined number of neighbor minutiae which are selected for every minutia extracted from a fingerprint image. Each neighbor minutia is characterized by three positional parameters with respect to the selected minutia. The positional parameters include a distance and two angles.

In one embodiment, an optional neighborhood boundary is drawn around a randomly-selected minutia. In one embodiment, if the number of neighbor minutiae within the neighborhood boundary is less than the predetermined number, all neighbor minutiae within the neighborhood boundary are selected. In another embodiment, a predetermined number of the closest neighboring minutiae are selected. In yet another embodiment, a predetermined number of neighbor minutiae giving the best spread around the randomly selected minutia are selected. In one embodiment, the minutiae having the farthest distance from each other are selected. In another embodiment, minutiae that are very close, e.g., less than approximately 10 pixels, to each other are not selected. In another embodiment, an arbitrary one of the very close minutiae is selected. In one embodiment, a quadrant is arbitrarily drawn using the randomly-selected minutia as the center point and a predetermined number of minutiae are selected from each quadrant.

An x-axis is drawn in the direction of the line tangential to the ridge at the randomly-selected minutia. A y-axis, perpendicular to the x-axis, is drawn. The x-axis and the y-axis intersect at the randomly-selected minutia. Hence, the randomly-selected minutia now has a position of (0,0) and is designated as the "center minutia." A first line is drawn between the center minutia and one of its neighbor minutiae. The first line has a distance $d_i$ which is one of the positional parameters representing the neighbor minutia. An angle $\phi_i$ between the first line and the x-axis is the second positional parameter representing the neighbor minutia. A second line is then drawn from the neighbor minutia to intersect the x-axis, in the direction of the line tangential to the ridge of neighbor minutia. The angle $\phi_i$ between the x-axis and the second line is the third positional parameter representing the neighbor minutia.

In one embodiment, each positional parameter is quantized to a selected number of bits. For example, each angle $\phi_i$ and $\phi_i$ is quantized to six bits and the distance $d_i$ is quantized to five bits.

A data chunk from each fingerprint template is loaded into a random access memory (RAM) to be compared. In one embodiment, the data chunks are sorted, but such sorting is optional. In one embodiment, the data chunks are sorted in accordance to their x-coordinates. In another embodiment, the data chunks are sorted in accordance to their y-coordinates. In one embodiment, the data chunks in the reference template are sorted. In another embodiment, the data chunks in the measured template are sorted. In yet another embodiment, both the measured template and the reference template are sorted.

Each of the characterization parameters, i.e., location, minutia angle, and neighborhood, of the measured data chunk to be compared is compared with its respective counterpart in the reference data chunk. The order of the comparison may be varied. For example, the location parameter in the x-coordinates of the measured minutiae are compared first to the corresponding x-coordinates of the reference minutiae. In another embodiment, location parameter in the y-coordinates of the measured minutiae are compared first to the corresponding y-coordinates of the reference minutiae. In one embodiment, the comparison is straight subtraction. If the difference for a parameter pair is equal to or is less than a respective predetermined tolerance, the parameters match. If all of the parameters match, the data chunks match. On the other hand, if one of the parameters fail to match, the data chunks do not match and the next set of data chunks are compared.

The data chunk comparison begins with the first reference data chunk and the first measured data chunk and terminates if the predetermined number of data chunk matches have been reached (i.e., the templates match) or if all of the data chunk combinations have been compared. In one embodiment, if the first reference data chunk and the first measured data chunk do not match, the next measured data chunk is loaded into the RAM to be compared with the first reference data chunk. The process continues until all the measured data chunks in the measured fingerprint template have been compared. The next reference data chunk and the first measured data chunk are then loaded into the RAM to be compared. The process continues until all the reference data chunks have been compared. In another embodiment, if the first reference data chunk does not match the first measured data chunk, the second reference data chunk is loaded into the RAM to be compared with the first measured data chunk. The process continues until all of the reference data chunks have been compared. The second measured data chunk and the first reference data chunk are then loaded into the RAM to be compared. The process continues until all of the measured data chunks have been compared.

In one embodiment, where the data chunks are sorted, the comparison between a reference data chunk and the remaining uncompared measured data chunks is terminated if the difference between the reference data chunk and the measured data chunk exceeds the tolerance. In one embodiment, the next comparison starts with the next reference data chunk and the first matching measured data chunk.

In the alternative embodiment, the comparison between a measured data chunk and the remaining uncompared reference data chunks is terminated if the difference between the measured data chunk and the reference data chunk exceeds the tolerance. In one embodiment, the next comparison starts with the next reference data chunk and the first matching measured data chunk.

In one embodiment, the neighbor minutiae in a neighborhood are sorted by distance $d_i$. The neighborhood comparison starts with the first neighbor in the reference neighborhood and the first neighbor in the measured neighborhood and terminates when the predetermined neighbor matches are reached (i.e., the neighborhoods match) or when all of the neighbor combinations have been compared. Each reference's positional parameter is compared with its corresponding measured positional parameter. In one embodiment, the comparison is done with straight subtraction. If the difference meets a predetermined tolerance, the parameters match. If all of the positional parameters in the neighbor minutia match, the neighbor minutiae match. If one of the positional parameters does not match, the neighbor minutiae do not match.

In one embodiment, the reference fingerprint template is stored in a static memory in a smart card and the fingerprint template matching algorithm is executed in a microprocessor in the smart card. In one embodiment, the reference fingerprint template is generated and stored at a smart card reader.

The above-described fingerprint template matching algorithm may be executed by a microprocessor with low memory and low computational capacities because the matching algorithm does not require computational intensive operations and does not require comparisons that exceeds 8 bits.

BRIEF DESCRIPTION OF THE DRAWINGS

FIG. 7A shows a reference data chunk comprising location, minutia angle and neighborhood parameters.

FIG. 7B shows a measured data chunk comprising location, minutia angle and neighborhood parameters.

FIG. 7C shows a reference neighborhood having various positional parameters.

FIG. 7D shows a measured neighborhood having various positional parameters.

Use of the same reference numbers in different figures indicates similar or like elements.

DETAILED DESCRIPTION

The following description is meant to be illustrative only and not limiting. Other embodiments of this invention will be obvious in view of the following description to those skilled in the semiconductor processing arts.

Figure 1:
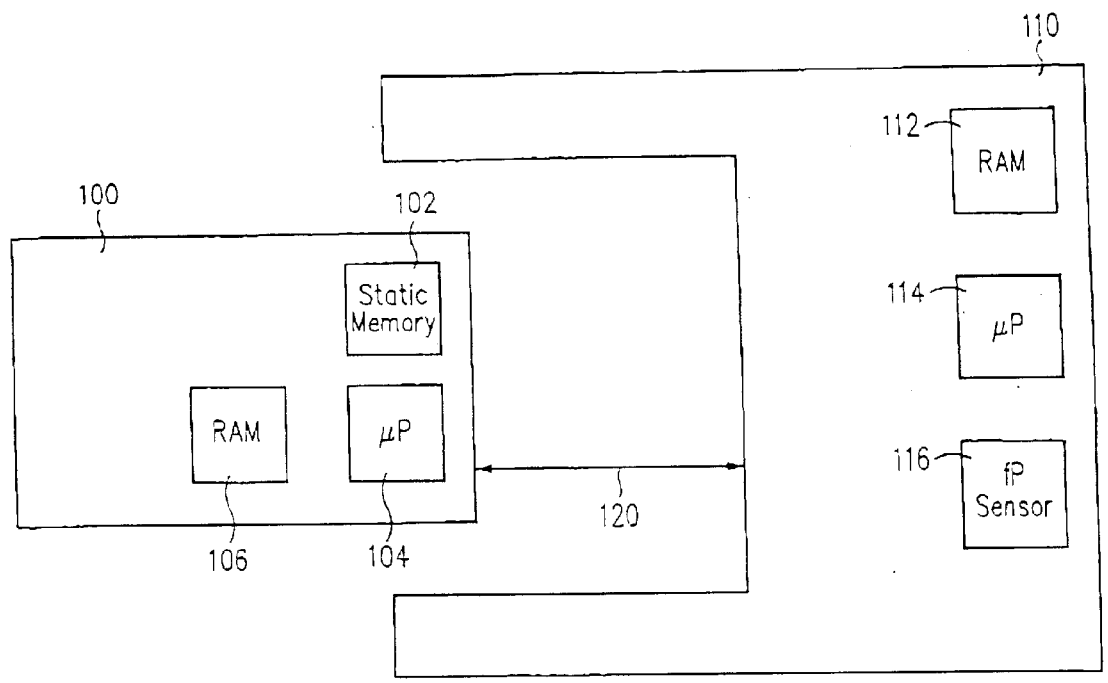
FIG. 1 shows a smart card system having a smart card reader for reading a smart card.

FIG. 1 shows one implementation of the present invention. FIG. 1 shows a smart card reader system having a smart card 100 and a smart card reader 110. Smart card 100 comprises a static memory 102 for storing a reference fingerprint template, a microprocessor 104 for executing a fingerprint template matching algorithm, and RAM (random access memory) 106. Smart card reader 110 has a RAM 112 for storing a measured fingerprint template, a microprocessor 114, and a fingerprint sensor 116. In one embodiment, fingerprint sensor 116 is a capacitive fingerprint sensor of the kind described in U.S. Pat. No. 6,016,355, which is hereby incorporated by reference in its entirety. Smart card reader 110 can be a stand-alone unit at a point-of-sale or can be embedded in an ATM, for example.

When a user wishes to gain access to smart card 100, he/she inserts smart card 100 into smart card reader 110. Smart card reader 110 then prompts the user to place his/her finger on fingerprint sensor 116. The prompt can be either visual or audible. Microprocessor 114 on smart card reader 110 then digitizes the electrical signal measured at fingerprint sensor 116, creates a fingerprint image, extracts minutiae from the fingerprint image, characterizes each minutia, creates a neighborhood for each minutia, and generates a measured fingerprint template from the characterization parameters and the neighborhood. The measured fingerprint template is then stored in RAM 112. Template construction is discussed in detail below.

Minutiae can be extracted from a fingerprint using any known methods. For example, ridge skeletonization technique can be used. This technique uses an iterative process to thin a ridge line by discarding pixels that do not affect the continuity of the ridge line until a single pixel line is remaining, the end point of which is the minutia. Other types of minutia extraction technique are described in, for example, U.S. Pat. No. 4,646,352 entitled "Method and Device for Matching Fingerprints with Precise Minutia Pairs Selected From Coarse Pairs" issued Feb. 24, 1987 to Asai et al. and U.S. Pat. No. 4,135,147 entitled "Minutiae Pattern Matcher" issued Jan. 16, 1979 to Riganati et al. The minutia extraction technique is not described in detail in this application because it is not part of the invention.

Smart card reader 110 then sends the measured fingerprint template to smart card 100 through a communication channel 120 at a selected speed, typically 9.6 Kilobits/second, or 9600 baud. Microprocessor 104 in smart card 100 receives the measured fingerprint template from smart card reader 110, reads the reference fingerprint template from static memory 102 into RAM 106 chunk by chunk as needed, and executes a fingerprint template matching algorithm to compare the two fingerprint templates.

Figures 2A, 2B:
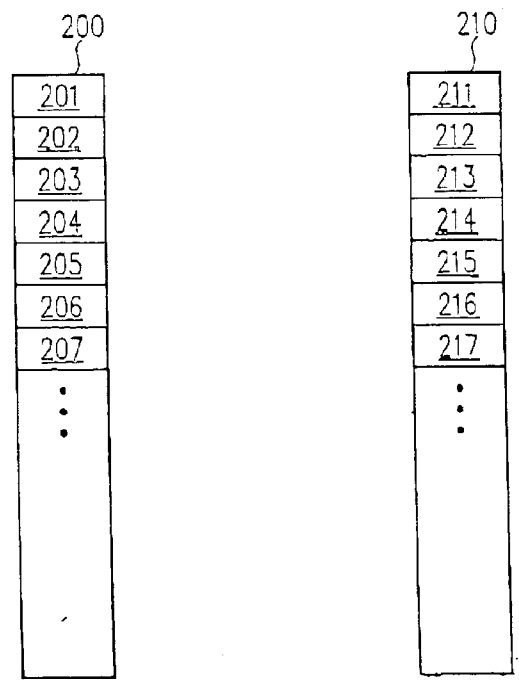
FIG. 2A shows a reference fingerprint template divided into data chunks.
FIG. 2B shows a measured fingerprint template to be compared divided into data chunks.

A collection of data chunk's representing a fingerprint, either referent or measured is referred to herein as a fingerprint template. A data chunk consists information of an extracted minutia it corresponds to, including location, minutia angle and neighborhood, which will be discussed below. FIGS. 2A, 2B, 3, 4A–4E, 5, 6 and 7A–7D show in detail how a fingerprint template is constructed. FIG. 2A shows a reference fingerprint template 200 having a plurality of data chunks 201, 202, 203, etc. Typically, reference fingerprint template 200 comprises 50 chunks, i.e., typically, 50 minutiae are extracted from a fingerprint image. In one embodiment, the minimum number of minutiae required is 10. The minimum number of minutiae is generally determined by the required matching accuracy. In one embodiment, the maximum number of minutiae allowed is 128. Number 128 is chosen as the maximum number of minutiae allowed because with a typical number of 50, 128 gives a sufficient range of the number of minutiae that may be extracted from a fingerprint image. Of course, the minimum and the maximum numbers of minutiae extracted may be modified to suit a particular application. Reference fingerprint template 200 is stored, for example, in static memory 102 on smart card 100.

FIG. 2B shows a measured fingerprint template 210 having a plurality of data chunks 211, 212, 213, etc. Similarly, measured fingerprint template 210 typically comprises 50 data chunks. Measured fingerprint template 210 is generated, for example, by smart card reader 110 and is stored in RAM 112 in smart card reader 110. The number of data chunks extracted from a measured fingerprint may be different from the number of data chunks extracted from a reference fingerprint due to possible false minutiae. In addition, the number of data chunks extracted from a measured fingerprint may be different from the number of data chunks extracted from a reference fingerprint because only a partial fingerprint is read. However, a match can nevertheless be had if the number of fingerprint data chunk matches satisfies a predetermined number of fingerprint data chunk matches. Therefore, the number of fingerprint data chunks in the measured fingerprint template does not need to be the same as the number of fingerprint data chunks in the reference fingerprint template.

In one embodiment, all the data chunks in both reference fingerprint template 200 and measured fingerprint template 210 contain the same number of bits. A data chunk is constructed for each and every minutia extracted from a fingerprint image. Therefore, the number of data chunks making up each fingerprint template is equal to the number of minutiae extracted from a fingerprint image. For example, if eighty minutiae are extracted from a fingerprint image, the fingerprint template will contain eighty data chunks.

Figure 3:
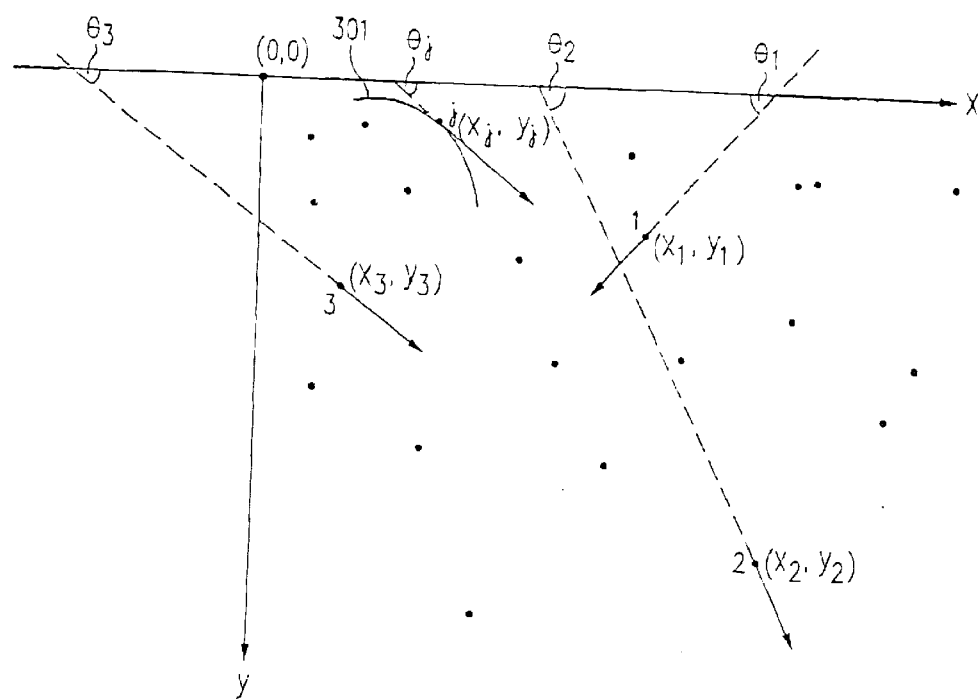
FIG. 3 shows how a minutia is represented.

FIG. 3 shows how each minutia is represented. An x-axis and a y-axis are constructed so that the point (0,0) is at the upper left hand corner of a fingerprint image. The x-axis and the y-axis are drawn regardless of the rotation or the translation of the fingerprint, as will be discussed later. Each minutia in a fingerprint image is characterized by location $(x_j, y_j)$ and a minutia angle $\theta_j$, where j is the number of minutiae extracted from a fingerprint image. Location $(x_j, y_j)$ is the location of minutia j with respect to x- and y-axis. Minutia angle $\theta_j$ is the angle between the x-axis and a line tangential to a ridge 301 where minutia j is extracted. Of importance, the minutiae of both the reference fingerprint and the measured fingerprint must contain the same characterization parameters.

Figure 4A:
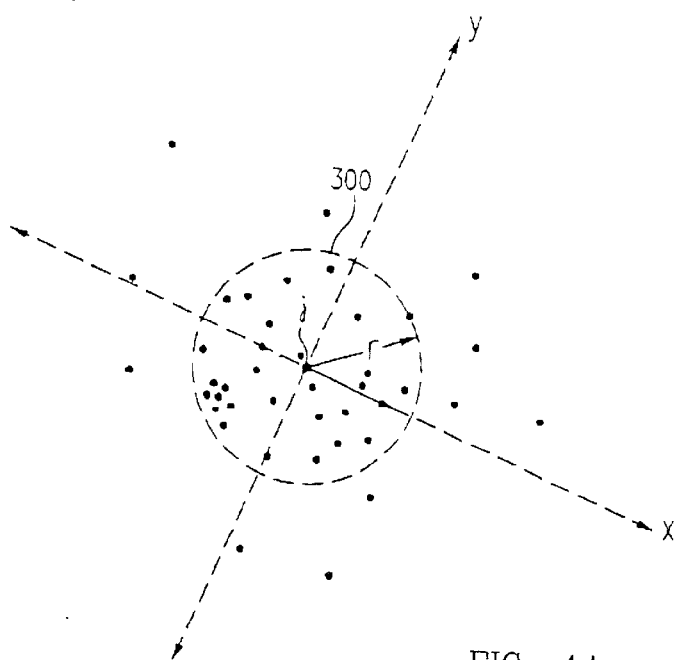
FIG. 4A shows a circular neighborhood boundary.
Figure 4B:
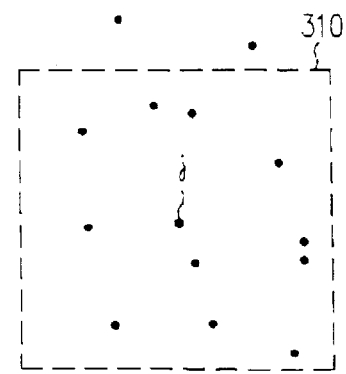
FIG. 4B shows a square neighborhood boundary.

A neighborhood $NH_j$ is constructed for each minutia j, as described below. FIGS. 4A–4E illustrate various ways of selecting neighbor minutiae in constructing a neighborhood $NH_j$ for minutia j. A neighborhood is constructed for each and every minutia extracted from a fingerprint image. In one embodiment, a neighborhood boundary is drawn around minutia j. For example, a circle 300 of a fixed radius r, e.g., 90 pixels, is drawn using minutia j as the center point, as shown in FIG. 4A, to provide a neighborhood boundary. In an alternative embodiment, a box 310, representing the neighborhood boundary, is drawn using minutia j as the center point, as shown in FIG. 4B. Of course, any predetermined neighborhood boundary of any shape or size can be drawn.

A predetermined number of neighbor minutiae are selected from the enclosed area. In one embodiment, fifteen (15) minutiae (excluding minutia j) within the neighborhood boundary are selected as the neighbor minutiae for neighborhood $NH_j$. If the enclosed area contains less than the predetermined number of neighbor minutiae, all of the neighbor minutiae contained in the enclosed area are selected. It is noted that neighborhood $NH_j$ contains multiple neighbor minutiae $N_1$–$N_i$ where i is a predetermined number, so that there is enough information to make the neighborhood $NH_j$ unique enough to meet the accuracy requirement. The number of the neighbors, in general, depends on the uniqueness of the neighborhood $NH_j$ desired. For example, if only four neighbors $N_1$–$N_4$ are selected for a neighborhood, the probability of having equivalent or matching neighborhoods is much higher than the corresponding probability associated with a neighborhood of fifteen neighbors. Similarly, a neighborhood having thirty neighbors would have a lower probability of being equivalent to other neighborhoods. The uniqueness of the neighborhood determines how often a good fingerprint is rejected (i.e., false rejection rate) and how often a bad fingerprint is accepted (i.e., false acceptance rate). The number of the neighbor minutiae also depends on the acceptable computational complexity or speed that can be satisfactorily performed by a microprocessor.

Figure 4C:
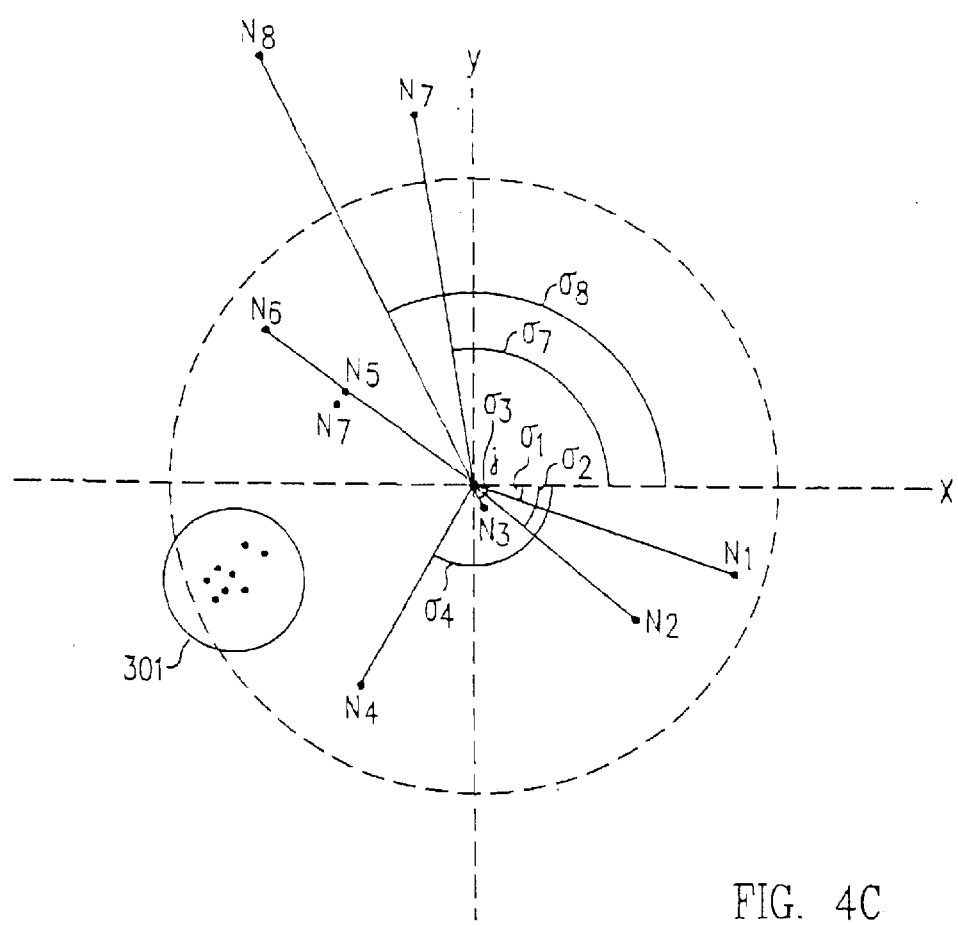
FIG. 4C shows a method of neighbor selection.

In one embodiment, the neighbor minutiae are selected such as to maximize the spread around the center point, i.e., minutia j. Referring to FIG. 4C, an x-axis is drawn in the direction of the line tangential to a ridge line at minutia j. A line is drawn from minutia j to a minutia $N_1$, forming an angle $\sigma_1$ between the x-axis and the line. Similarly, a line is drawn from minutia j to each of the remaining minutiae within the enclosed area, each forming an angle $\sigma_k$ with the x-axis, where k is the number of the minutiae within the enclosed area. A mean is calculated from all the angles $\sigma_k$.

In one embodiment, the mean is calculated in a complex domain since mean calculation in a degree domain would be more complicated due to the cyclical nature of the angles. A complex number C can be described as a sum of its real and imaginary parts a and b, respectively, i.e., C=a+ib where i is the square root of −1.

Figure 4D:
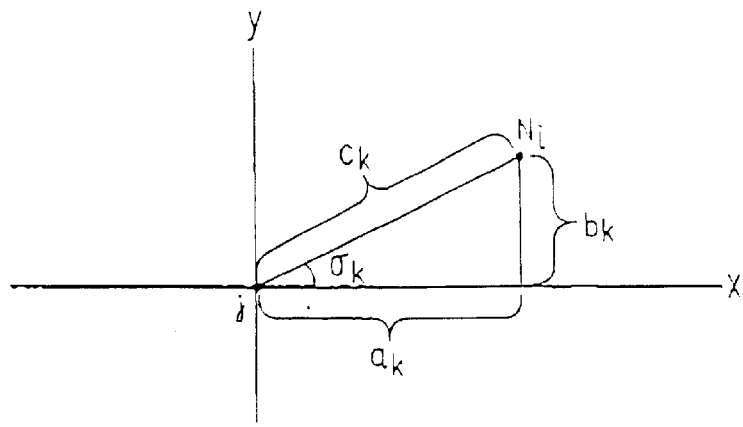
FIG. 4D shows an angle to be represented in complex domain.

Referring to FIG. 4D, angles can be expressed in terms of complex numbers by the following equality:

$$C_k = \cos(\sigma_k) - i\sin(\sigma_k)$$

where $$\sigma_k = \tan^{-1}(b_k/a_k)$$

Thus, the real part of angle $\sigma_k$ is $a_k = \cos(\sigma_k)$ and the imaginary part of angle $\sigma_k$ is $b_k = \sin(\sigma_k)$. To get an average of all the angles $\sigma_k$, each angle $\sigma_k$ is converted to its complex equivalent. The real part $\sigma_k$ and the imaginary part $b_k$ are then averaged separately. The averaged real part $a_{avg}$ and the averaged imaginary part $b_{avg}$ are then converted back to a real number representation $$a_{avg} = \frac{\sum_k (a_k)}{k}, \quad b_{avg} = \frac{\sum_k (b_k)}{k},$$

In one embodiment, each angle $\sigma_k$ is examined to determine how close it is to the average angle $\sigma_{avg}$ by subtracting angle $\sigma_k$ from average angle $\sigma_{avg}$ to get a difference $\sigma_{kdiff}$. A predetermined number of minutiae that have the largest difference $\sigma_{kdiff}$ are selected so that the entire neighborhood has maximum standard angular deviation. It is noted that if there is a cluster of minutiae such as cluster 301 shown in FIG. 4C, the average would be closer to cluster 301. Thus the minutiae that are within cluster 301 would be closer to the mean. In one embodiment, if the number of minutiae within the boundary is more than the predetermined number of neighbor minutiae, the minutiae within cluster 301 would not be selected. If one or more minutiae must be selected from cluster 301 to meet the predetermined number of neighbor minutiae, the minutiae are selected randomly. In other words, the minutiae within cluster 301 are less likely to be selected than the minutiae outside of cluster 301.

In one embodiment, if multiple minutiae, such as minutiae $N_5$ and $N_6$, have the same angles, the distances between minutia $N_5$ and minutia j and between minutia $N_6$ and minutia j are used for a tie breaker, e.g., the shorter the distance, the more likely the minutia would be selected. In another embodiment, if a minutia, i.e., minutia $N_3$, is too close to minutia j, e.g., 10 pixels, the minutia is not selected. In yet another embodiment, the neighbor minutiae that are furthest away (in distance) from each other are selected. In one embodiment, if two or more neighbor minutiae are very close to each other, e.g., 10 pixels, such as neighbor minutia $N_5$ and neighbor minutia $N_7$, either both neighbor minutiae $N_5$ and $N_7$ are eliminated or one of neighbor minutiae $N_5$ and $N_7$ is arbitrarily selected.

Figure 4E:
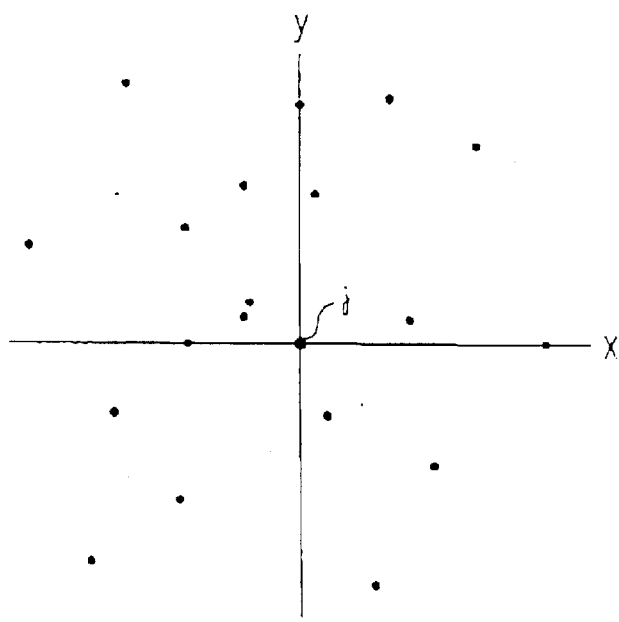
FIG. 4E shows an embodiment of a method of neighbor selection.

The neighborhood boundary is optional in selecting neighbor minutiae for a neighborhood. For example, the neighbor minutiae are selected such as to maximize the spread around the center point, i.e., minutia j, as described above. However, in this embodiment, all of the minutiae extracted from the fingerprint are used to calculate the mean. All the other embodiments described above are also applicable to neighbor minutiae selection without a boundary. In an additional embodiment, a quadrant is arbitrarily drawn with minutia j as the center point and a predetermined number of neighbor minutiae are then selected from each quadrant, as shown in FIG. 4E. In general, any neighbor minutiae extraction method may be used to extract the predetermined number i of neighbor minutiae for constructing a neighborhood $NH_j$.

After the neighbor minutiae are selected, a neighborhood $NH_j$ is constructed by deriving three positional parameters for each neighbor minutia. The positional parameters are derived in reference to minutia j. These positional parameters include a distance $d_i$ and two angles $\phi_i$ and $\phi_i$, where i is the number of neighbor minutiae.

Figure 5:
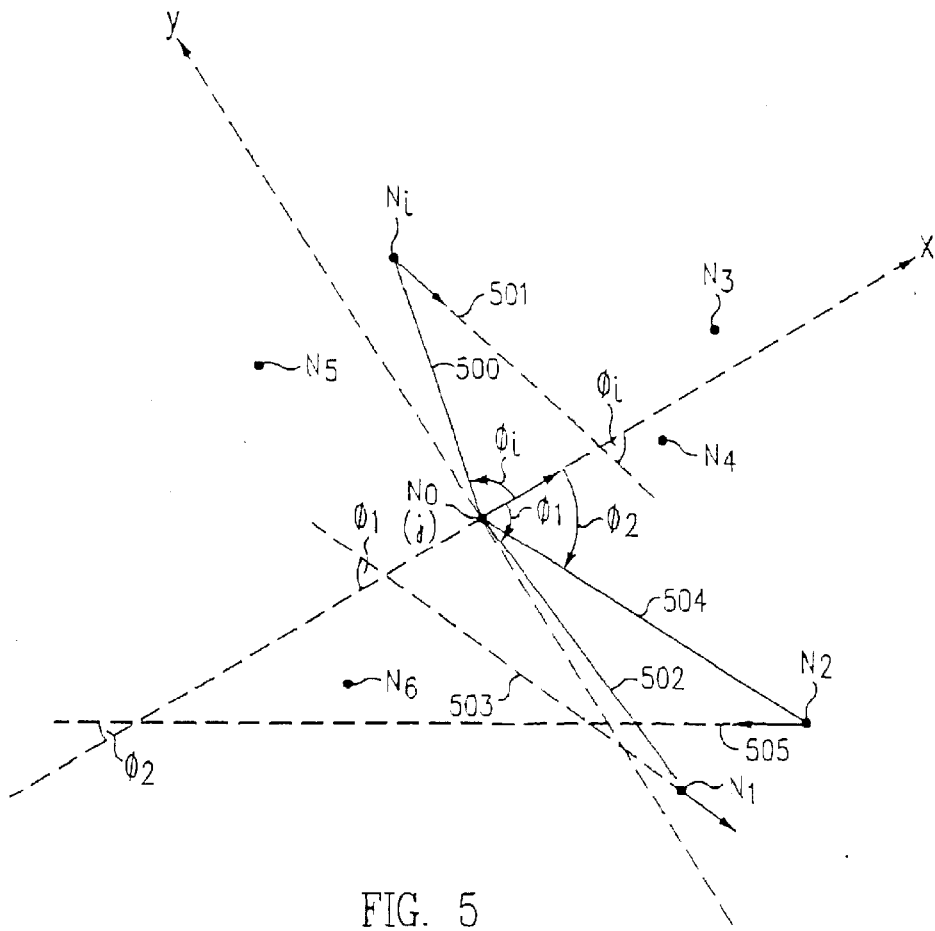
FIG. 5 shows construction of positional parameters for a neighbor minutia.

FIG. 5 shows how the positional parameters are derived. An x-axis is drawn in the direction of the line tangential to a ridge line at minutia j. A y-axis perpendicular to the x-axis is then drawn, intersecting the x-axis at minutia j. Hence, minutia j has a position of (0,0) and will be designated as the "center minutia $N_0$." A line 500 is drawn from center minutia $N_0$ to a neighbor minutia $N_i$. Line 500 has a distance $d_i$. An angle $\phi_i$ is created between the x-axis and line 500. Another line 501 is drawn from neighbor $N_i$ in the direction of a line tangential to a ridge line for neighbor minutia $N_i$ to intersect and extend through the x-axis. The angle between the extended line 501 and the x-axis is angle $\phi_i$. Hence, neighbor minutia $N_i$ may be represented by ($d_i$, $\phi_i$, $\phi_i$). Similarly, neighbor minutia $N_1$ is at a distance $d_1$ from center minutia $N_0$. An angle $\phi_1$ is created between line 502 and the x-axis. Angle $\phi_1$ is created between line 503 and the x-axis. Neighbor minutia $N_2$ is at a distance $d_2$ from center minutia $N_0$. An angle $\phi_2$ is created between line 504 and the x-axis. An angle $\phi_2$ is created between line 505 and the x-axis. The process is repeated for all i neighbor minutiae of center minutia $N_0$. Hence, for a neighborhood having 15 neighbors (i.e., i=15) each of the 15 neighbors $N_1$, $N_2$, $N_3$, ..., $N_{15}$ is represented by ($d_i$, $\phi_i$, $\phi_i$). Importantly, distance $d_i$ and angles $\phi_i$ and $\phi_i$ are independent of any rotation or translation of a fingerprint image because these are relative positions with respect to center minutia $N_0$. Hence, when a fingerprint image is rotated or translated, all the minutiae associated with that center minutia $N_0$ are translated and rotated in the same fashion and amount and their relative positions with respect to the center minutia $N_0$ remain the same.

In one embodiment, each of the parameters $d_i$, $\phi_i$, and $\phi_i$ are quantized to a selected number of bits. Quantization allows the reduction of the number of bits to represent a value. More specifically, during quantization, all the numbers that fall between two boundary values are discretized to a quantization value between the boundary numbers.

There are several approaches to derive the quantization value. In linear quantization, a quantization value can be derived by, e.g., a practical approach or a centroid approach. In the practical approach, the quantization value can be calculated by rounding the quotient of an equation, e.g., x/N, where x is the unquantized value and N is the quantization interval, to the closest integer number. For example, if the unquantized value is 5 and the quantization interval is 2, the quantization value is obtained by rounding 5/2=2.5, or 3. Similarly, if the unquantized value is 5 and the quantization interval is 4, then quantization value is obtained by rounding 5/4=1.25 or 1. In a centroid approach, the quantization value is computed as $$C = \frac{\int_i^j xp(x)dx}{\int_i^j p(x)dx},$$

where C is the quantization value; i and j are the boundary numbers of the interval to be quantized; and p is the probability of occurrence of each number x.

In non-linear quantization, a look-up table may be created to specify the quantization value for each unquantized value. For example, the lookup table may specify for unquantized values from 0 to 1, the quantization value is 1; for unquantized valued from 1 to 3, the quantization value is 2; for unquantized values from 3 to 6, the quantization value is 5; and so on. Non-linear quantization has the advantage of setting the quantization value in accordance to the errors associated with each minutia. For example, for a given minutia, the closer the neighbor minutia is to the given minutia, the smaller the error. Similarly, the further the neighbor minutia, the larger the error. Therefore, for neighbor minutiae closer to the given minutia, the parameters associated with the neighbor minutia needs to be quantized more finely than the neighbor minutiae that are further away.

Although any amount of quantization may be used, the amount of quantization depends on the preciseness of the match desired and the memory space available. As is well known in the art, the more the quantization, the less the preciseness of the representation and the less the storage space is required. For example, for a set of unquantized values 1 through 10, 4 bits are required to represent each number. If the quantization interval is 2, then the largest quantization value needs to be represented is 10/2 or 5. Hence, all 10 numbers can be represented by 3 bits, requiring less storage space. Similarly, if the quantization interval is 5, the largest quantization value needs to be represented is 10/5 or 2. Hence, unquantized values 1 through 10 can now be represented by 2 bits, requiring even less storage space. However, the largest error in the first example would be 1 and the largest error in the second example would be 2.5. Hence, the more the quantization, the less the storage requirement and the larger the error.

In one embodiment, distance $d_i$ is quantized to five bits. In another embodiment, angles $\phi_i$ and $\phi_i$ are quantized to six bits each.

Figure 6:
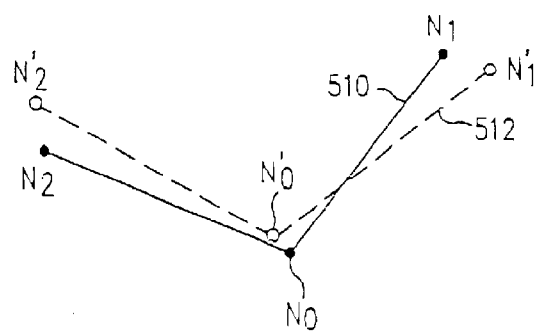
FIG. 6 shows two neighborhoods with errors between them.

FIG. 6 illustrates two neighborhoods with slight errors, both rotational and translational. Reference neighborhood 510 is constructed with a center minutia $N_0$ and two neighbor minutiae $N_1$ and $N_2$. Measured neighborhood 512 is constructed with a center minutia $N_0'$ and two neighbor minutiae $N_1'$ and $N_2'$. As can be seen, reference neighborhood 510 and measured neighborhood 512 show some resemblance, i.e., neighbor minutiae $N_1$ and $N_2$ and $N_1'$ and $N_2'$, respectively, have similar positional relationships with respect to their center minutiae $N_0$ and $N_0'$, respectively. However, there are errors between the two neighborhoods. For example, there are slight differences in the distances as well as the angles. The slight differences may be due to the fact that a finger has a fluid surface, thus the surface of the finger stretches and varies under different conditions. Hence, these two slightly varied neighborhoods may be the fingerprint from the same finger, but created at different times. The fingerprint matching algorithm, therefore, must take these slight variations into account because if a perfect match is required, the numerous erroneous rejections will render fingerprint identification impractical.

Because matching tolerances must be accepted, the errors caused by a certain amount of quantization becomes unimportant in the resulting accuracy of the comparison. For example, if the tolerance of distance $d_i$ is set to 1 and the maximum error caused by quantization of distance $d_i$ is also 1, if both the reference distance and the measured distance falls into the same quanta, the distances match even though the actual distances may be different. The acceptable tolerance, therefore, determines how much quantization can be done for each parameter.

Another advantage for quantization is to increase the data transmission speed because the size of the data packets becomes smaller after quantization. In one embodiment, the quantized values are compressed using well-known compression method such as, but not limited to, run-length encoding or L-Z-W (Lemtel-Ziv-Welch) compression. In the run-length encoding, for example, if there are five number zero in a row, instead of storing the numbers as "0 0 0 0 0," the numbers are stored as "5 0." In the L-Z-W compression, a dictionary of frequently repeated groups of (8-bit) characters is built on a per-file basis in order to represents frequent character-strings as shorter bit patterns. Hence, compression allows the data to be represented by fewer bits, thus allowing the data transmission to be faster and data storage to be smaller. In one embodiment, the compressed values are transmitted from smart card reader 110 into smart card 100 and are decompressed at smart card 100.

In one embodiment, the location information, i.e., $(x_j, y_j)$ and the minutia angle $\theta_j$ are quantized to a selected number of bits. For example, each of the position measurements $x_j$ and $y_j$ is quantized to four bits and the minutia angle $\theta_j$ is quantized to six bits.

The size of a data chunk is determined by the size of the parameters representing the location of the minutia, the minutia angle, and its neighborhood. In one embodiment, each data chunk in the fingerprint template is 34 bytes in size. In this embodiment, the fingerprint template is made of 1-byte location information (i.e., two 4-bit measurements $x_j$ and $y_j$), 6-bit minutia angle $\theta_j$ information, and fifteen 17-bit (5 bits for $d_i$, 6 bits each for angles $\phi_i$ and $\phi_i$) neighborhood information.

As will be seen later, the fingerprint template matching algorithm compares the fingerprint templates on a chunk-by-chunk basis. Hence, the fingerprint template matching algorithm requires RAM 106 to be of a size large enough to store at least two data chunks, e.g., 68 bytes of data. In a conventional smart card where the typical RAM is 256 bytes in size, no additional memory is required because the required memory in accordance with this invention is within, in fact, well under, the memory confinement of a conventional smart card.

FIG. 7A shows reference data chunk 201 of reference fingerprint template 200 in detail. Reference data chunk 201 includes three parameters: location 702, minutia angle 704, and neighborhood 706. Location 702 includes x- and y-coordinates. Neighborhood 706, in one embodiment, includes 15 neighbor minutiae $N_1$ through $N_{15}$. Each neighbor $N_1$ through $N_{15}$ further includes positional parameters such as distance $d_i$ between the center minutia $N_0$ and the neighbor minutia $N_i$ and two related angles $\phi_i$, $\phi_i$, where i is 1 through 15, as shown in FIG. 7C.

Similarly, FIG. 7B shows data chunk 211 of measured fingerprint template 210 in detail. Measured data chunk 211 includes three parameters: location 752, minutia angle 754, and neighborhood 756. Location 752 includes x- and y-coordinates $x_j'$ and $y_j'$. Neighborhood 756, in one embodiment, includes 15 neighbors $N_1'$ through $N_{15}'$. Each neighbor $N_1'$ through $N_{15}'$ further includes positional parameters such as distance $d_i'$ between the center minutia $N_0'$ and a neighbor $N_i'$ and two related angles $\phi_i'$, $\phi_i'$, where i is 1 through 15, as shown in FIG. 7D. Although FIGS. 7A and 7B show the same number of neighbors in reference fingerprint data chunk 201 and measured fingerprint data chunk 211, it is not necessary because a neighborhood match may be found if the number of neighbor minutia matches satisfies the predetermined number of neighbor minutia matches. For example, for a certain neighborhood boundary drawn, the enclosed area at the reference fingerprint contains enough minutiae to select the predetermined number of neighbor minutiae, e.g., 15 minutiae. However, the enclosed area at the measured fingerprint only contains less than the predetermined number of neighbor minutiae, e.g., 12 minutiae. If the predetermined neighbor minutia match is 7 and there are 7 matches between the measured neighbor minutiae and the reference neighbor minutiae, there is a match between the reference neighborhood and the measured neighborhood even though neighborhood 706 contains different number of neighbors from neighborhood 756.

Figure 8A:
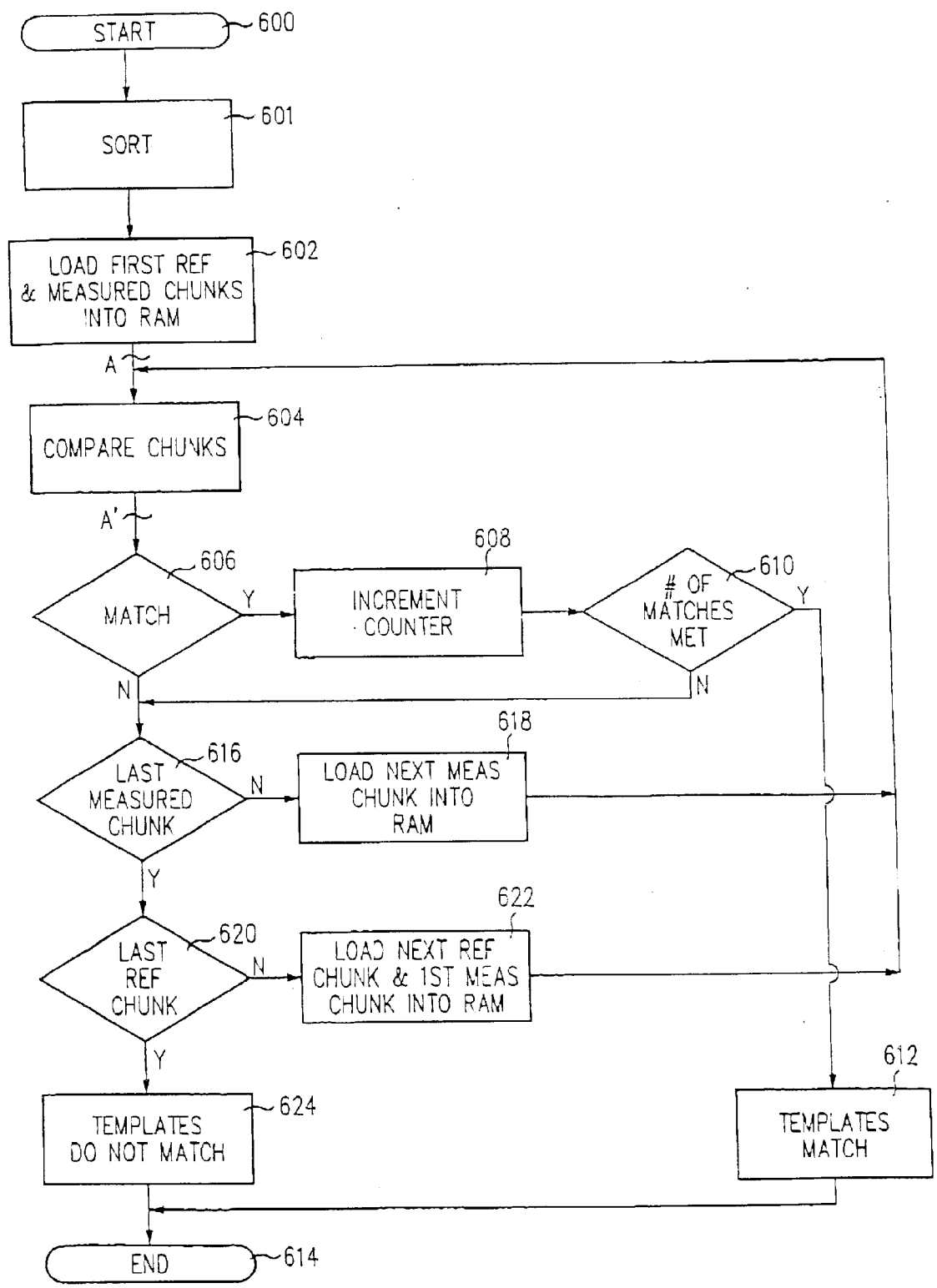
FIG. 8A shows a flowchart of a method of template comparison.

FIG. 8A illustrates the fingerprint template matching process in a smart card application. It is noted that although a fingerprint template matching algorithm is described with respect to a smart card and a smart card reader, the fingerprint template matching algorithm described hereinafter can also be executed by, for example, a personal computer, a microprocessor system, or a palm computer.

The template matching process starts with step 600. In one embodiment, the reference data chunks and the measured data chunks are sorted (step 601), but the sorting is not required. In one embodiment, the data chunks are sorted according to its location information which is represented by the x- and y-coordinates. For example, the data chunks are sorted according to increasing x-coordinate $x_j$ followed by increasing y-coordinate $y_j$. Of course, any sorting technique can be used to sort the data chunks. In general, minutia angle $\theta_j$ is not used for sorting due to the cyclical nature of angle measurements. In one embodiment, either the reference data chunks or the measured data chunks are sorted. In another embodiment, both the reference data chunks and the measured data chunks are sorted. The data chunks are sorted for efficiency purpose, as will be explained below.

Because the fingerprint templates are compared on a chunk-by-chunk basis and the fingerprint templates are serialized, no random access to the fingerprint templates is needed. In other words, once a data chunk has been used, that data chunk is discarded from RAM 106 and a new data chunk is read in. This allows the storage of only one data chunk from each template in RAM 106 during the comparison process.

The first data chunk of measured fingerprint template 210, e.g., measured chunk 211, is loaded from, for example, RAM 112 in smart card reader 110 into RAM 106 (step 602) through communication channel 120 (also refer to FIG. 1). Also in step 602, the first data chunk of reference fingerprint template 200, e.g., reference chunk 201, is loaded from static memory 102 into RAM 106 of smart card 100. Microprocessor 104 compares the two data chunks, i.e. measured chunk 211 and reference chunk 201 in RAM 106 (step 604). How the data chunks are compared in step 604 is discussed in detail later with reference to FIGS. 9A, 9B and 9C.

If the two fingerprint template data chunks, e.g., reference chunk 201 and measured chunk 211, match (step 606), a counter is incremented in step 608. If the number of fingerprint data chunk matches is equal to or greater than a predetermined number (step 610), measured fingerprint template 210 is considered to match reference fingerprint template 200 (step 612) and the fingerprint template matching process terminates in step 614. In one embodiment, more than four data chunk matches is considered a match.

If the two fingerprint template data chunks, e.g., reference chunk 201 and measured chunk 211, do not match (step 606) or if the number of data chunk matches is less than the predetermined number (step 610), it is determined whether the measured chunk used for the comparison, e.g., measured chunk 211, is the last measured chunk in measured fingerprint template 200 (step 616).

If the measured chunk, e.g. measured chunk 211, is not the last measured chunk in measured fingerprint template 210, the next measured chunk, e.g., measured chunk 212, in measured fingerprint template 210 is loaded into RAM 106 from RAM 112 via communication channel 120 (step 618). The newly loaded measured chunk, e.g., measured chunk 212, is compared with the reference chunk in RAM 106, e.g., reference chunk 201 (step 604). The process continues until all measured chunks in measured fingerprint template 210 have been compared or until a predetermined number of data chunk matches have been found.

If the measured chunk, e.g., measured chunk 201, is the last reference chunk in measured fingerprint template 210, then it is determined whether the reference chunk in RAM 106 used for comparison, e.g., reference chunk 201, is the last data chunk in reference fingerprint template 210 (step 620).

If the reference chunk, e.g., reference chunk 201, is not the last reference chunk in reference fingerprint template 200, the next reference chunk in reference fingerprint template 200, e.g., reference chunk 202, is loaded, for example, from static memory 102 into RAM 106 (step 622). Also in step 622, the first measured chunk in fingerprint template 210, e.g., measured chunk 211, is loaded into RAM 106. The newly loaded reference chunk, e.g., reference chunk 202, and first measured chunk, e.g., measured chunk 211, are then compared in step 604. The process is continued until all reference chunks in reference fingerprint template 200 are compared or until the number of data chunk matches exceeds the predetermined number.

If the reference chunk, e.g., reference chunk 201, is the last reference chunk in reference fingerprint template 200, reference fingerprint template 200 and measured fingerprint template 210 do not match (step 624) and the fingerprint template matching process terminates in step 614.

Figure 8B:
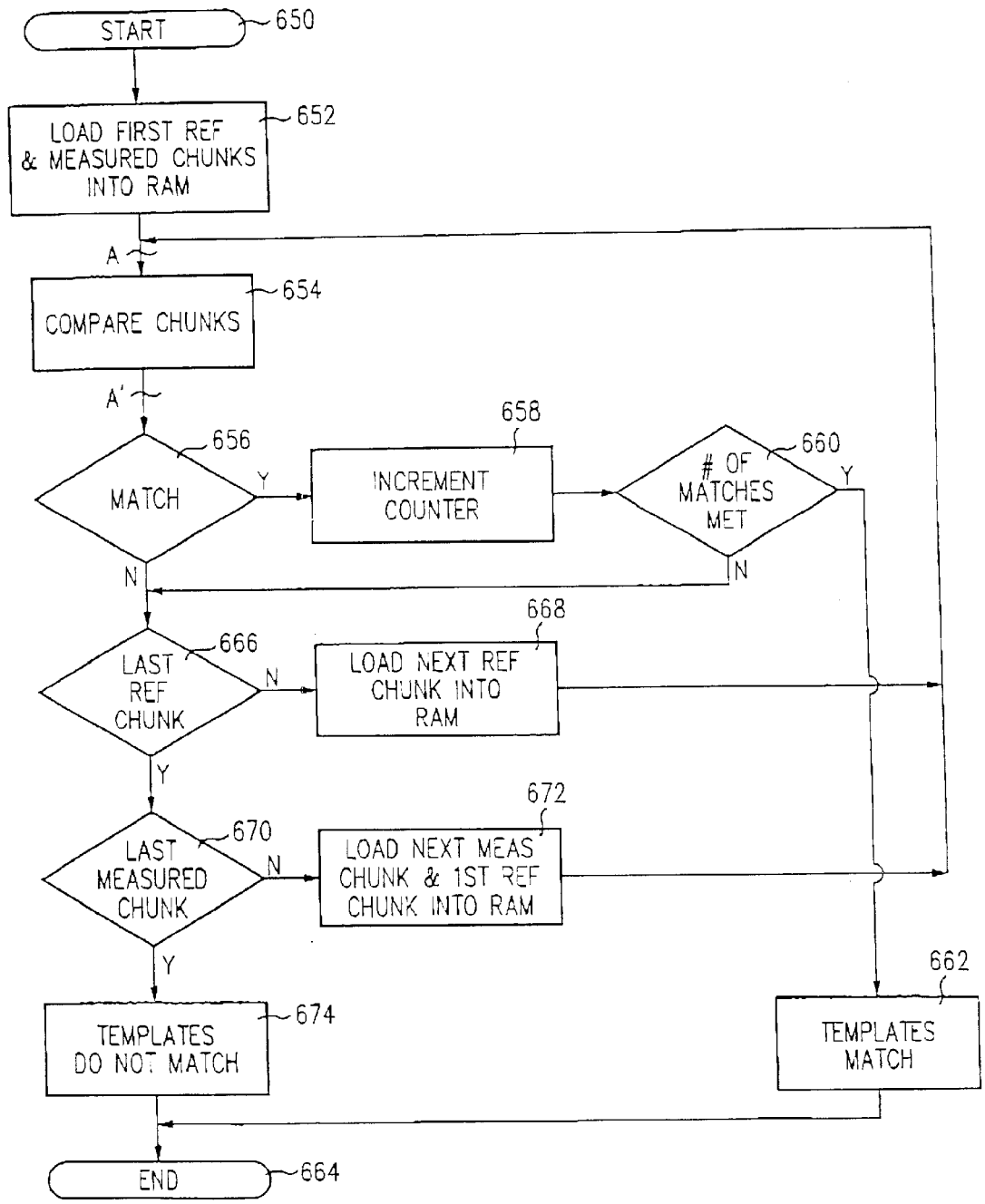
FIG. 8B shows a flowchart of another method of template comparison.

Alternatively, the fingerprint template matching process can be carried out in accordance with FIG. 8B. In FIG. 8B, the optional sorting is eliminated; the reference chunks are rotated first; the measured chunks are then rotated. In particular, the fingerprint template matching process starts at step 650. The first data chunk of measured fingerprint template 210, e.g., measured chunk 211, is loaded from smart card reader 110 into RAM 106 (step 652) through communication channel 120. Also in step 652, the first data chunk of reference fingerprint template 200, e.g., reference chunk 201, is loaded from static memory 102 into RAM 106 of smart card 100. Microprocessor 104 compares the two fingerprint template data chunks, e.g., measured chunk 211 and reference chunk 201 in RAM 106 (step 654). How the data chunks are compared in step 654 is discussed in detail below with reference to FIG. 9C.

If the two data chunks, e.g., chunks 201 and 211, match (step 656), a counter is incremented in step 658. If the number of data chunk matches is equal to or is greater than a predetermined number (step 660), measured fingerprint template 210 matches reference fingerprint template 200 (step 662) and the process ends in step 664.

On the other hand, if the two data chunks, e.g., data chunks 201 and 211 do not match (step 656) or if the number of matches of the data chunks is less than the predetermined number (step 660), it is determined whether the measured chunk used for comparison, e.g., reference chunk 201, is the last reference chunk in reference fingerprint template 200 (step 666).

If the reference chunk, e.g., reference chunk 201, is not the last data chunk in reference fingerprint template 200, the next reference chunk, e.g., reference chunk 202, in reference fingerprint template 200 is loaded from static memory 102 into RAM 106 (step 668). The newly loaded reference chunk, e.g., reference chunk 202, is compared with the measured chunk in RAM 106, e.g., measured chunk 211, in step 654. The process continues.

If the reference chunk, e.g., reference chunk 201, is the last reference chunk in reference fingerprint template 200, it is determined whether the measured chunk in RAM 106 used for comparison, e.g., measured chunk 211, is the last measured chunk in measured fingerprint template 210 (step 670).

If the measured chunk, e.g., measured chunk 211, is not the last data chunk in measured fingerprint template 210, the next measured chunk in measured fingerprint template 210, e.g., measured chunk 212, is loaded from RAM 112 into RAM 106 of smart card 100 via communication channel 120 (step 672). The first reference chunk in fingerprint template 200, e.g., reference chunk 201, is also loaded into RAM 106 (step 672). The newly loaded measured chunk, e.g., measured chunk 212, and the first reference chunk, e.g., reference chunk 201, are then compared (step 654).

If the measured chunk, e.g., measured chunk 211, is the last measured chunk in measured fingerprint template 210, measured fingerprint template 210 and reference fingerprint template 200 do not match (step 674) and the fingerprint template matching process terminates at step 664.

Figure 9A:
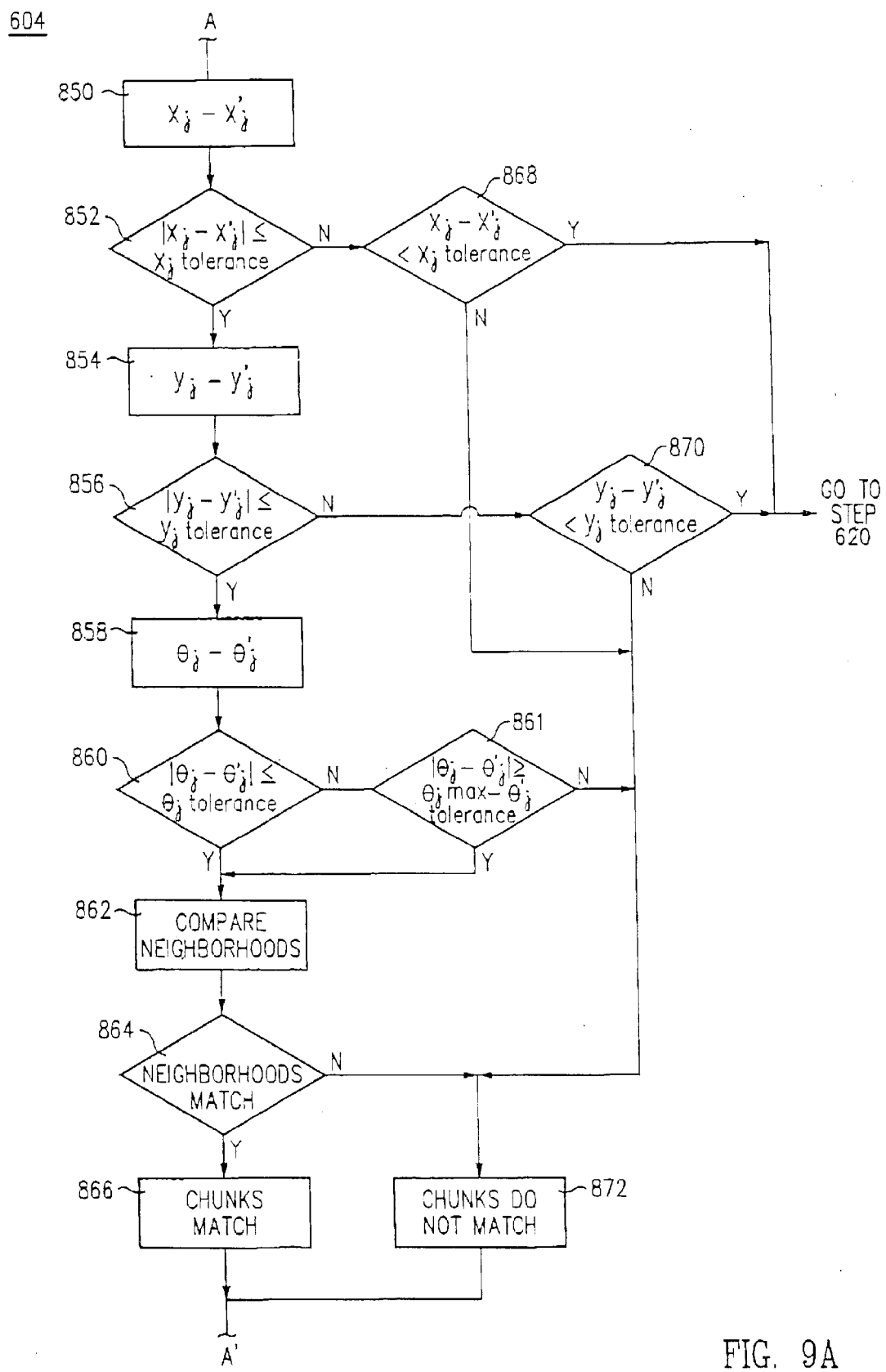
FIG. 9A shows a flowchart of a method of detailed data chunk comparison.

FIG. 9A illustrates a flowchart of step 604 of how the fingerprint template data chunks are compared in detail. A reference chunk includes a positional parameter $(x_j, y_j)$ where $x_j$ is the x-coordinate and $y_j$ is the y-coordinate of a reference minutia. A measured chunk includes a positional parameter of $(x_j', y_j')$ where $x_j'$ is the x-coordinate and $y_j'$ is the y-coordinate of a measured minutia. In this embodiment, the measured data chunks are sorted in accordance with x-coordinates $x_j$ followed by y-coordinates $y_j$. In one embodiment, the x-coordinates are compared by subtracting measured x-coordinate $x_j'$ from reference x-coordinate $x_j$, i.e. $x_j - x_j' = x_{jdiff}$ (step 850). If the absolute value of difference $x_{jdiff}$ is greater than the predetermined tolerance $x_{jtolerance}$ (step 852), then it is determined whether the raw difference $x_{jdiff}$ is less than the predetermined tolerance $x_{jtolerance}$ (step 868). If difference $x_{jdiff}$ is less than $x_{jtolerance}$, the rest of the measured data chunks will not be compared against the reference data chunk and it is determined whether the reference chunk used is the last reference chunk (step 620 in FIG. 8A) and the process continues. If the difference $x_{jdiff}$ is greater than $x_{jtolerance}$, the chunks do not match (step 872) and the process continues at step 606 (FIG. 8A).

If the absolute value of the difference $x_{jdiff}$ is less than or equal to a predetermined tolerance $x_{jtolerance}$ (step 852), i.e., the x-coordinates match, the y-coordinates are compared. Measured y-coordinate $y_j'$ is subtracted from reference y-coordinate $y_j$, i.e. $y_j - y_j' = y_{jdiff}$ (step 854). If the absolute value of the difference $y_{jdiff}$ is greater than the predetermined tolerance $y_{jtolerance}$ (step 856), it is determined whether the raw difference $y_{jdiff}$ is less than $y_{jtolerance}$. If difference $y_{jdiff}$ is less than $y_{jtolerance}$, the remaining measured data chunks will not be compared against the reference data chunk and it is determined whether the reference chunk used for comparison is the last reference chunk (step 620 in FIG. 8A). If difference $y_{jdiff}$ is greater than $y_{jtolerance}$, the chunks do not match (step 872) and the process continues at step 606 (FIG. 8A). If the absolute value of the difference $y_{jdiff}$ is less than or equal to a predetermined tolerance $y_{jtolerance}$ (step 856), i.e., the y-coordinates match, the minutia angles $\theta_j$ and $\theta_j'$ are compared.

It is noted that a straight subtraction in degree domain does not work well with angles due to their cyclical nature. Measured minutia angle $\theta_j'$ is subtracted from reference minutia angle $\theta_j$, i.e. $\theta_j - \theta_j' = \theta_{jdiff}$ (step 858). If the absolute value of the difference $\theta_{jdiff}$ is less than or equal to a predetermined tolerance $\theta_{jtolerance}$ (step 860), i.e., the minutia angles match. If the absolute value of the difference $\theta_{jdiff}$ is greater than the predetermined tolerance $\theta_{jtolerance}$, it is determined whether the absolute value of the difference $\theta_{jdiff}$ is greater than or equal to the difference between the maximum allowable quantized minutia angle $\theta_{jmax}$ and the predetermined tolerance $\theta_{jtolerance}$ (step 861). If value $|\theta_{jdiff}|$ is greater than or equal to the difference between values $\theta_{jmax}$ and $\theta_{jtolerance}$, the minutia angles match.

An example for angle comparison is described below. In the embodiment where the angles are quantized to 6 bits, thus having values 0 to 63, 0 is the minimum value for $\theta_j$ ($\theta_{jmin}$) and 63 is the maximum value for $\theta_j$ ($\theta_{jmax}$). The quantized values are then subtracted, e.g., $|\theta_j - \theta_j'| = \theta_{jdiff}$, if minutia angle $\theta_j$ has a quantized value of 61 while minutia angle $\theta_j'$ has a quantized value of 63, and the match tolerance is 2. Then $|61-63|=2$, which is within the tolerance range. Thus, there is a match between minutia angles $\theta_j$ and $\theta_j'$. In a situation where angle $\theta_j$ has a quantized value of 0 while minutia angle $\theta_j'$ has a quantized value of 63, and the match tolerance is 2. Then $|0-63|=63$, which is out of the tolerance range. However, due to the cyclical nature, the difference between 63 and 0 is actually only 1, which is within the tolerance. Therefore, in addition to checking whether $|\theta_j - \theta_j'| \leq \theta_{jtolerance}$, whether $\theta_{jdiff} \geq \theta_{jmax} - \theta_{jtolerance}$ is also checked. In the above example, $\theta_{jdiff} \geq \theta_{jmax} - \theta_{jtolerance}$ ($63 \geq 63-2$) is true. Therefore, minutia angles $\theta_j$ and $\theta_j'$ match.

Figure 10:
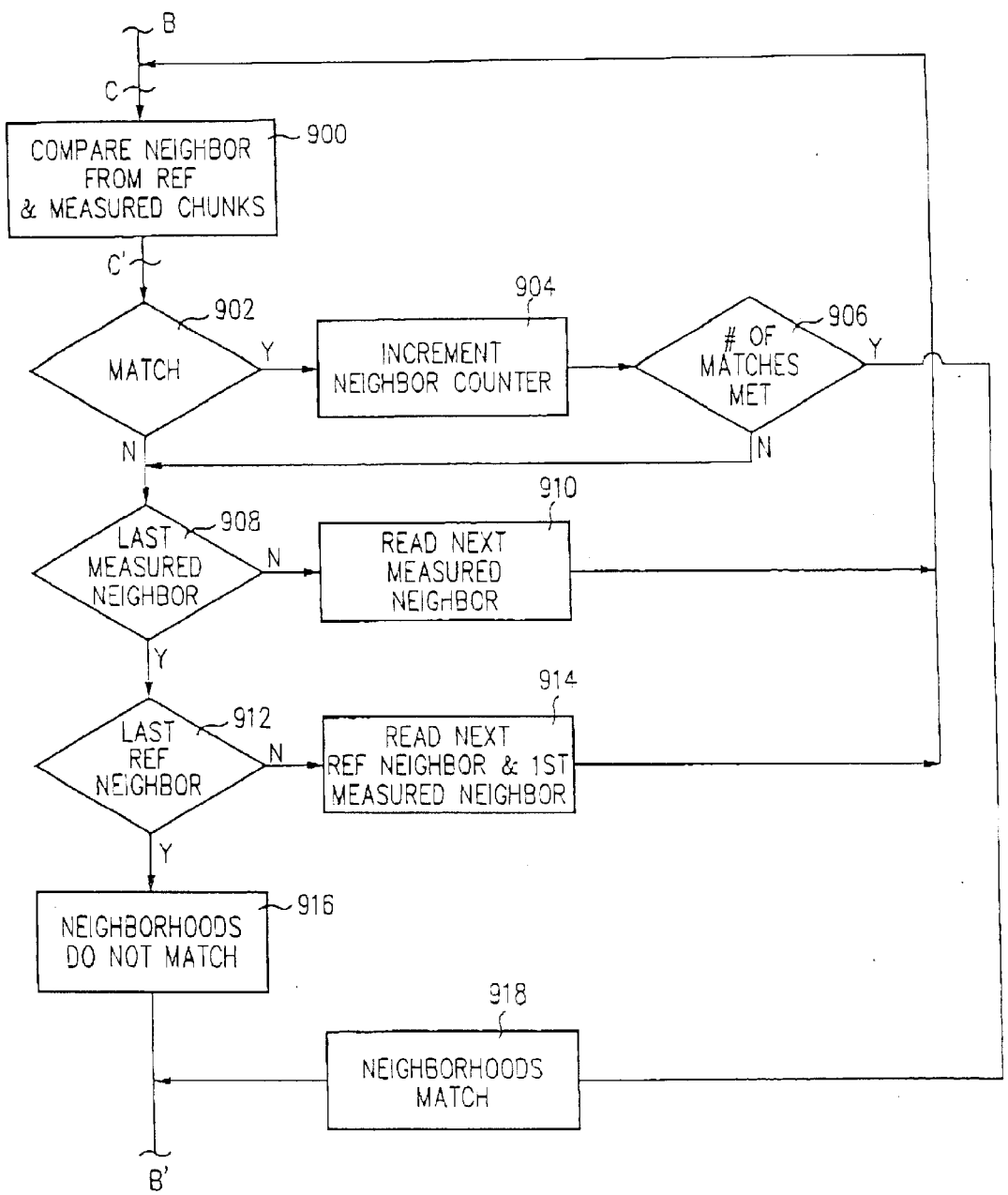
FIG. 10 shows a flowchart of a method of detailed neighborhood comparison.

If the minutia angles $\theta_j$ and $\theta_j'$ match, neighborhood $NH_j$ is compared with neighborhood $NH_j'$ in step 862, which is described in detail in reference to FIG. 10.

If the neighborhood $NH_j$ from the reference chunk matches neighborhood $NH_j'$ from the measured chunk (step 864), the data chunks match (step 866). Conversely, if any of the parameters, i.e. x-coordinates, y-coordinates, minutia angles and neighborhoods, fail to match, the data chunks do not match (step 872). The typical value for $x_{jtolerance}$ and $y_{jtolerance}$ is 4 and the typical value for $\theta_{jtolerance}$ is 7. These typical values are derived from experimentation.

Since the measured data chunks are sorted in accordance with the x-coordinates $x_j$, the comparisons for the remaining measured data chunks can be eliminated because the remaining measured data chunks will also have x-coordinates $x_j'$ exceeding the tolerance. Hence, sorting cuts down the number of comparisons. The number of comparisons can be further reduced by sorting the data chunks by y-coordinates $y_j$.

Figure 9B:
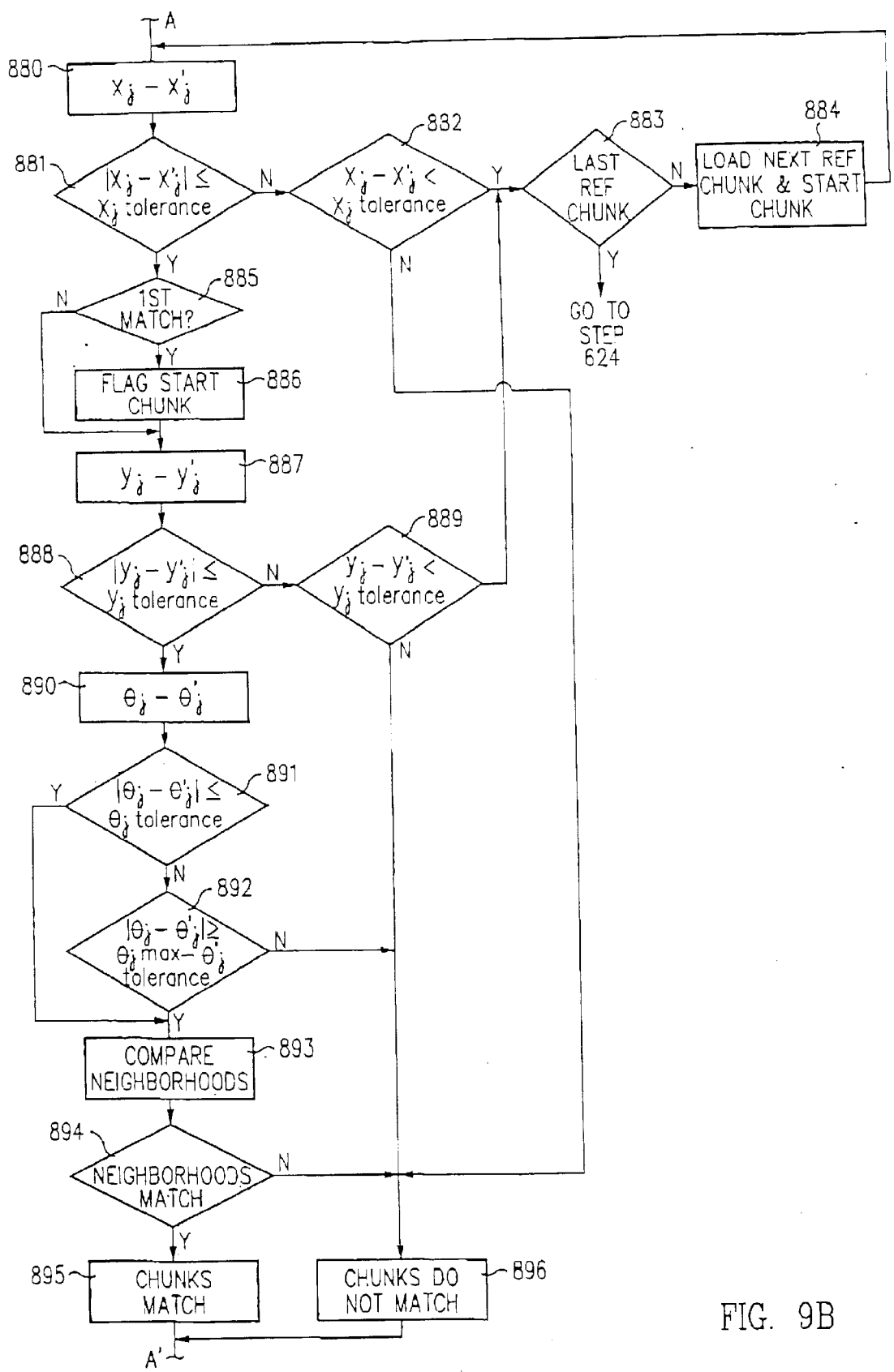
FIG. 9B shows a flowchart of a method of detailed data chunk comparison.

A flag can be set so that only a subset of the measured data chunks is used for further comparisons. FIG. 9B illustrates a flowchart of step 604 of how the fingerprint template data chunks are compared in detail. The x-coordinates are compared by subtracting measured x-coordinate $x_j'$ from reference x-coordinate $x_j$, i.e. $x_j - x_j' = x_{jdiff}$ (step 880). If the absolute value of the difference $x_{jdiff}$ is less than or equal to a predetermined tolerance $x_{jtolerance}$ (step 881), it is determined whether this is the first match between reference x-coordinate $x_j$ and measured x-coordinate $x_j'$ (step 885). If the match is the first match, a flag is set for the measured chunk containing the first matching x-coordinate $x_j'$ (step 886).

If the absolute value of the difference $x_{jdiff}$ is greater than the predetermined tolerance $x_{jtolerance}$ (step 881), then it is determined whether the difference $x_{jdiff}$ is less than the predetermined tolerance $x_{jtolerance}$ (step 882). If difference $x_{jdiff}$ is less than $x_{jtolerance}$, the rest of the measured data chunks will not be compared against the reference data chunk and it is determined whether the reference chunk used is the last reference chunk (step 883). If the reference chunk is not the last chunk in the reference fingerprint template, the next reference chunk and the start chunk is loaded into the RAM for comparison (step 884) and the process continues with step 880. If the reference chunk is the last chunk in the reference fingerprint template, the fingerprint templates do not match (step 624 in FIG. 8A).

If the match is not the first match (step 885) or after the start chunk has been flagged (step 886), the y-coordinates are compared. Measured y-coordinate $y_j'$ is subtracted from reference y-coordinate $y_j$, i.e. $y_j - y_j' = y_{jdiff}$ (step 887). If the absolute value of the difference $y_{jdiff}$ is greater than the predetermined tolerance $y_{jtolerance}$ (step 888), it is determined whether the difference $y_{jdiff}$ is less than $y_{jtolerance}$ (step 889). If difference $y_{jdiff}$ is less than $y_{jtolerance}$, the remaining measured data chunks will not be compared against the reference data chunk and it is determined whether the reference chunk used for comparison is the last reference chunk (step 883). If difference $y_{jdiff}$ is greater than $y_{jtolerance}$, the chunks do not match (step 896) and the process continues at step 606 (FIG. 8A).

If the absolute value of the difference $y_{jdiff}$ is less than or equal to a predetermined tolerance $y_{jtolerance}$ (step 888), the remaining steps 890 through 896 are similar to steps 858–866 described in reference to FIG. 9A.

As can be seen from FIGS. 9A and 9B, x-coordinates and y-coordinates comparison filters the number of comparisons. Although the fingerprint template matching algorithm is capable of comparing a fingerprint with a rotated and/or translated same fingerprint, the algorithm can execute faster if the finger is constrained in a certain orientation. By allowing translation and rotation, none, or very few values can be eliminated because the tolerance must be sufficiently large so as not to eliminate everything during the comparison and thus generating a false rejection.

Figure 9C:
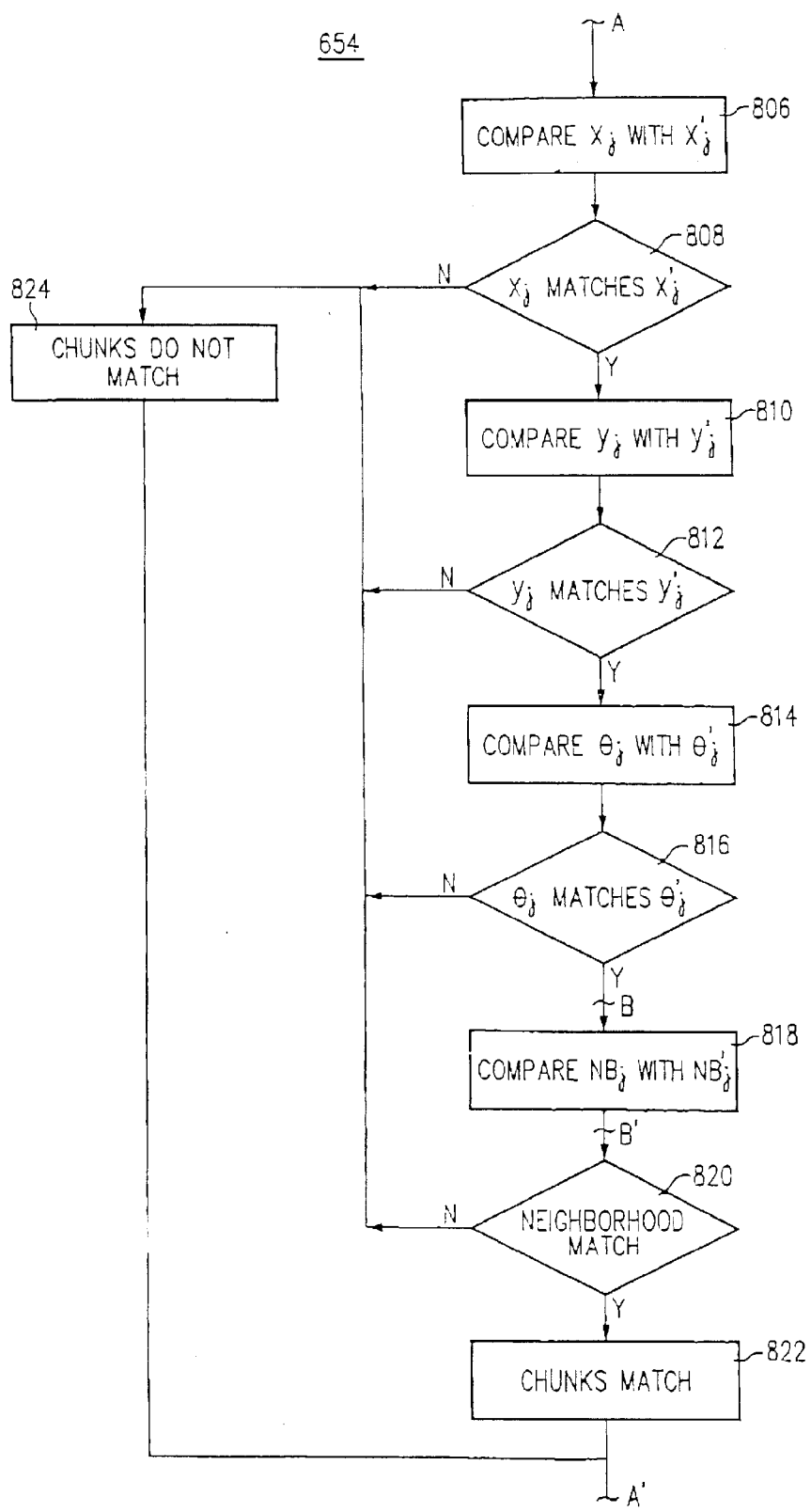
FIG. 9C shows a flowchart of a method of detailed data chunk comparison.

FIG. 9C illustrates a flowchart of step 654 of how the fingerprint template data chunks are compared in detail, where every chunk is compared. Parameters $x_j$ and $x_j'$ are compared (step 806), e.g., by straight subtractions. If value $x_{jdiff}$, i.e., $|x_j-x_j'|=x_{jdiff}$, is greater than a tunable, predetermined tolerance $x_{jtolerance}$, parameter $x_j$ does not match parameter $x_j'$. Therefore, the data chunks do not match (step 824) and the next data chunk is read (refer to FIG. 8B). When value $x_{jdiff}$ is equal to or is less than the tolerance $x_{jtolerance}$ (step 812), parameter $x_j$ matches parameter $x_j'$ (step 808) and parameter $y_j$ is compared with parameter $y_j'$ in step 810 with a straight subtraction.

If value $y_{jdiff}$, i.e. $|y_j'-y_j|=y_{jdiff}$, is greater than a tunable, predetermined tolerance $y_{jtolerance}$, parameter $y_j$ does not match parameter $y_j'$ (step 812) and the data chunks do not match (step 824). The next data chunk is read (see FIG. 8B). When value $y_{jdiff}$ is equal to or is less than the tolerance $y_{jtolerance}$, parameter $y_j$ matches parameter $y_j'$ (step 812) and parameter $\theta_j$ is compared with parameter $\theta_j'$ in step 814.

If minutia angle difference $\theta_{jdiff}$ is greater than a tunable, predetermined minutia angle tolerance $\theta_{jtolerance}$, parameter $\theta_j$ does not match parameter $\theta_j'$ (step 816) and the data chunks do not match (step 824) and the next data chunk is read (see FIGS. 8A and 8B). When minutia angle difference $\theta_{jdiff}$ is equal to or is less than the minutia angle tolerance $\theta_{jtolerance}$ or when difference $\theta_{jdiff}$ is greater than or equal to the maximum allowable quantized minutia angle minus the predetermined tolerance $\theta_{jtolerance}$, parameter $\theta_j$ matches parameter $\theta_j'$ (step 816) and neighborhood $NH_j$ is compared with neighborhood $NH_j'$ in step 818, which is described in detail in reference to FIG. 10. If the neighborhood $NH_j$ from the reference chunk matches neighborhood $NH_j'$ from the measured chunk (step 820), the data chunks match (step 822). Conversely, if the neighborhood $NH_j$ and neighborhood $NH_j'$ do not match, the data chunks do not match. The sequence of comparison may vary. For example, parameter $y_j$ maybe compared before comparing parameter $x_j$; angle $\theta_j$ maybe compared before comparing parameter $y_j$; and so on.

FIG. 10 shows a flowchart of the neighborhood matching algorithm of steps 862, 893 and 818. In step 900, the first neighbor in an reference chunk (hereinafter reference neighbor), e.g., $N_1$ (FIG. 7A), and the first neighbor in a measured chunk (hereinafter measured neighbor), e.g., $N_1'$ (FIG. 7B), are compared. Step 900 is described in detail below.

If the neighbors match (step 902), a neighbor counter is incremented in step 904. If the counter value is equal to or is greater than a predetermined number of neighbor matches (step 906), the neighborhoods match (step 918). For example, 7 neighbor matches for a 15-neighbor neighborhood can be considered a match of the neighborhoods.

If the neighbors do not match (step 902) or if the number of neighbor matches is less than the predetermined number of neighbor matches (step 906), it is determined whether the measured neighbor used in comparison is the last neighbor in the measured chunk (step 908).

If the measured neighbor is not the last measured neighbor in the measured chunk, the next measured neighbor is read (step 910) and the new measured neighbor is compared with the reference neighbor already in use. If the measured neighbor is the last measured neighbor in the measured chunk, it is determined whether the reference neighbor is the last reference neighbor in the reference chunk (step 912). If the reference neighbor is not the last reference neighbor in the reference chunk, the next reference neighbor and the first measured neighbor are read (step 914) and compared (step 900). If, however, the reference neighbor is the last reference neighbor in the reference chunk, the neighborhoods do not match (step 916).

Figure 11A:
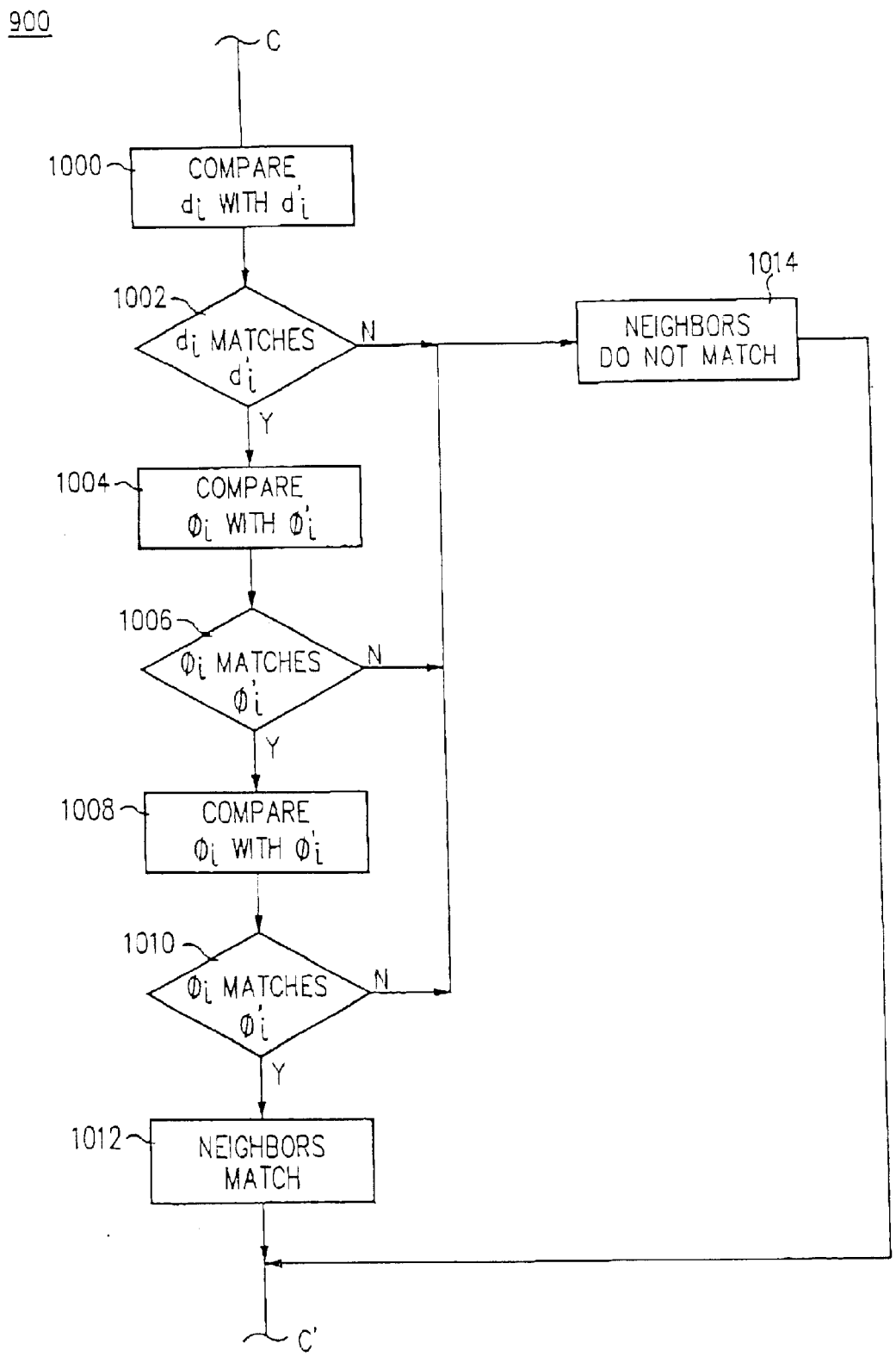
FIG. 11A shows a flowchart of a method of detailed neighbor comparison.

FIG. 11A illustrates step 900 in FIG. 10 in detail and shows a neighbor to neighbor comparison. The distances $d_i$ of an reference neighbor is compared with a distance $d_i'$ of a measured neighbor in step 1000. This distance comparison is done with straight subtractions, i.e. $|d_i-d_i'|=d_{idiff}$. If the distance difference $d_{idiff}$ meets the distance tolerance $d_{itolerance}$ (step 1002), angle $\phi_i$ is compared with angle $\phi_i'$ (step 1004).

Angle comparison is again done in a similar manner as minutia angle comparison described above. Specifically, angle $\phi_i$ matches angle $\phi_i'$ if $|\phi_i-\phi_i'|\leq\phi_{jtolerance}$ and $\phi_i-\phi_j'\geq\phi_{jmax}-\phi_{jtolerance}$ (step 1006).

Angles $\phi_i$ and $\phi_i'$ are then compared in step 1008. Similarly, angle $\phi_i$ matches angle $\phi_i'$ if $|\phi_j-\phi_j'|\leq\phi_{jtolerance}$ and $\phi_j-\phi_j'\geq\phi_{jmax}-\phi_{jtolerance}$ (step 1010). The neighbors match (step 1012) if all parameters for a neighbor, e.g., distance $d_i$ and angles $\phi_i$ and $\phi_i$, match. The typical value for $d_{itolerance}$ is 1 and the typical value for $\phi_{itolerance}$ and $\phi_{itolerance}$ is 6. These typical values are derived from experimentation.

If any of the parameters, i.e., distance $d_i$ or angle $\phi_i$ or $\phi_i$, do not match, the neighbors do not match (step 1014). Again, the sequence of comparison, i.e., $d_i$, $\phi_i$ and $\phi_i$, may be modified.

Figure 11B:
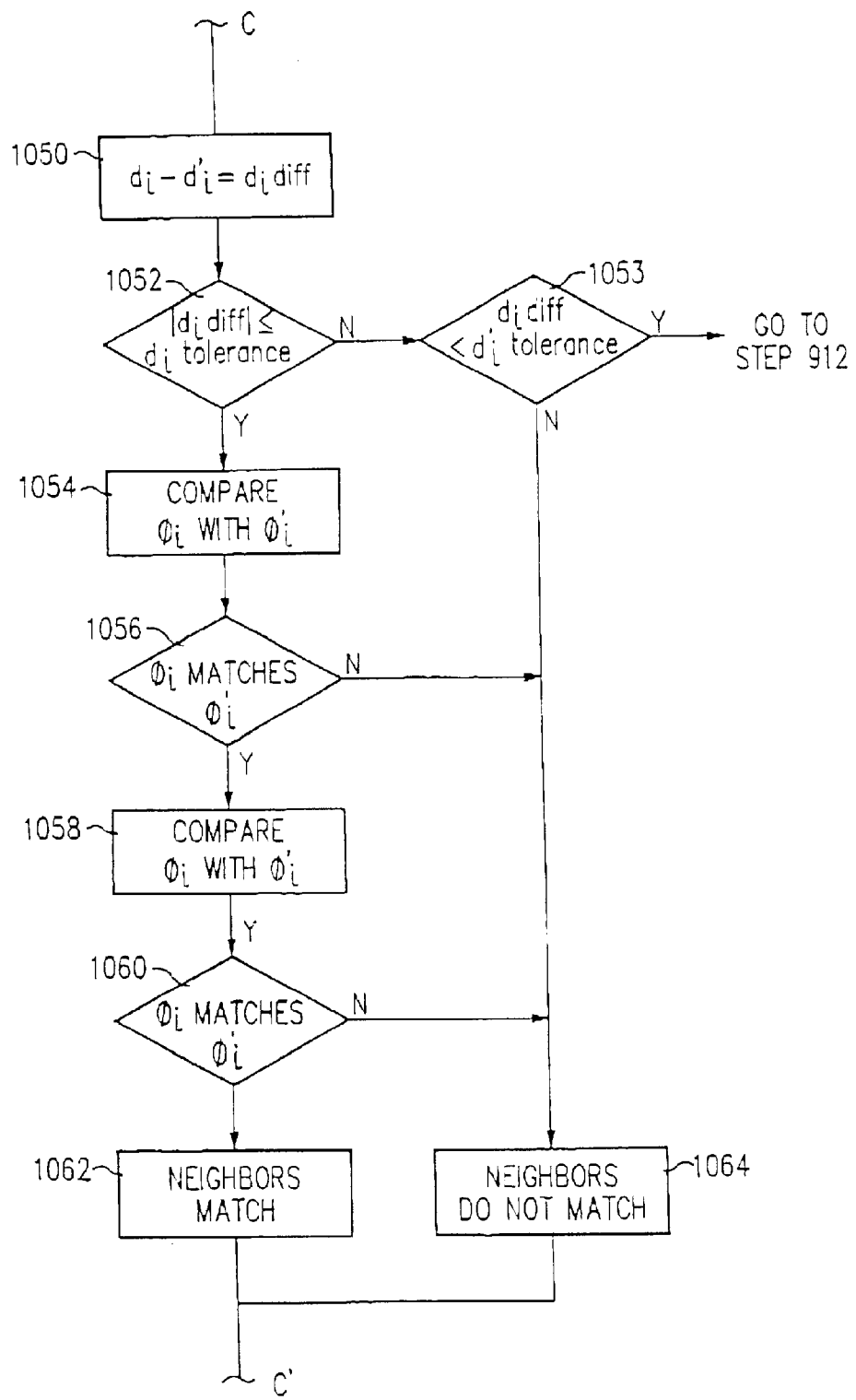
FIG. 11B shows a flowchart of a method of detailed neighbor comparison, with the neighbors sorted.

FIG. 11B shows an alternative embodiment of neighbor comparison process in step 900. In this embodiment, the measured chunks are sorted in accordance with distance $d_i'$. Measured distances $d_i'$ is subtracted from reference distance $d_i$ to derive a difference $d_{idiff}$ (step 1050). If the distance difference $d_{idiff}$ meets a predetermined distance tolerance $d_{itolerance}$ (step 1052), angle $\phi_i$ is compared with angle $\phi_i'$ (step 1054). If angles $\phi_i$ and $\phi_i'$ match (step 1056), $\phi_i$ and $\phi_i'$ are compared in step 1058. If angles $\phi_i$ and $\phi_i'$ match (step 1060), the neighbors match (step 1062).

If measured distance $d_i$ does not match reference a distance $d_i'$, it is determined whether the difference $d_{idiff}$ is less than the predetermined tolerance $d_{itolerance}$ (step 1053). If the difference $d_{idiff}$ is less than the predetermined tolerance $d_{itolerance}$, the neighbors do not match and the remaining measured neighbors are not compared. The process continues with step 912 in FIG. 10. If any of the parameters, i.e., distance $d_i$ or angle $\phi_i$ or $\phi_i$, do not match, the neighbors do not match (Step 1064).

Figure 12:
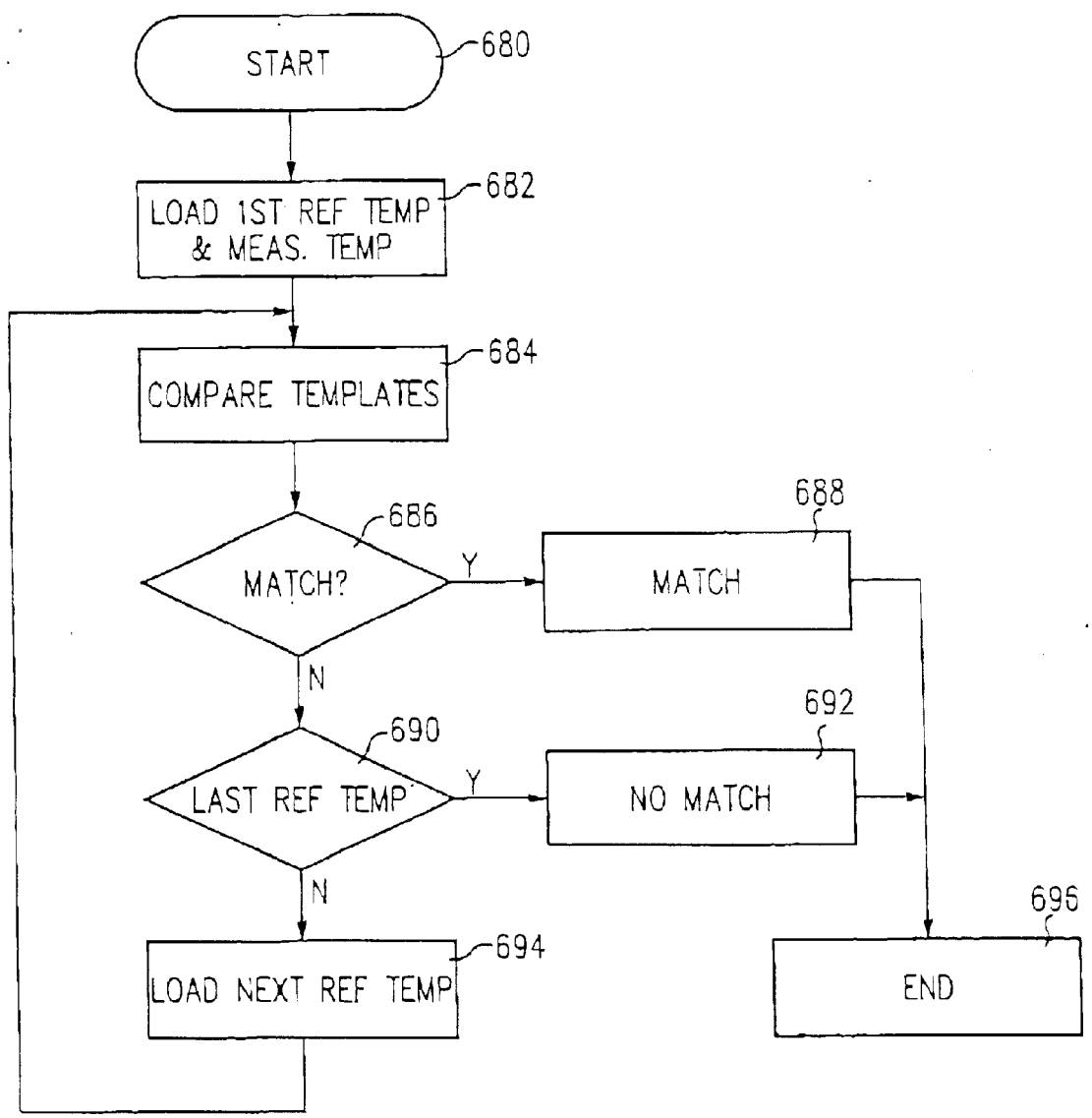
FIG. 12 shows a flowchart of a method of fingerprint template comparison in a multiple user situation.

In one embodiment, for multiple users where multiple reference fingerprints are stored in a database, if the measured fingerprint template does not match the first reference fingerprint template, the next reference fingerprint template is compared with the measured fingerprint template, as shown in FIG. 12. Multiple reference fingerprint template comparison starts with step 680. The first reference fingerprint template and the measured fingerprint template are loaded into the RAM (one chunk at a time)(step 682). The fingerprint templates are compared in step 684, in accordance with the template comparison algorithm described above, with reference to FIGS. 8A and 8B. Whether there is a match between the fingerprint templates is determined in step 686. If there is a match (step 688), the process ends in step 696. If there is no match, it is determined whether the last reference fingerprint template has been used (step 690). If the last reference fingerprint template has been used, there is no match (step 692) and the process ends in step 696. However, if the last reference fingerprint template has not been used (step 690), the next reference fingerprint template is loaded to be compared with the measured fingerprint template (step 694). In general, the number of reference templates can be stored is limited by the memory capacity. For example, in a conventional smart card, the typical static memory available is 1 Kilobytes to 16 Kilobytes. Therefore, the number of reference templates can be stored is limited by that memory capacity.

In another embodiment for a multi-user system, the measured fingerprint template is compared with all the reference templates in a similar manner as described above. However, in this embodiment, for each template comparison, all data chunks in both the measured fingerprint template and the reference template are compared. For example, even when a match is found for a pair of fingerprint templates, e.g., more than four data chunk matches, the remaining combinations of data chunks are compared. The number of data chunk matches for each reference fingerprint template is stored. If the measured fingerprint template matches more than one reference fingerprint templates, then the user producing the reference fingerprint template that gives the highest number of data chunk matches is identified as the user.

The algorithm in accordance with the present invention may be executed in a microprocessor having minimal capabilities, such as an 8-bit microprocessor on a conventional smart card because every parameter used in the algorithm is less than 8 bits. For example, location parameters $x_j$ and $y_j$ are quantized to four bits each; minutia angle $\theta_j$ and angles $\phi_i$ and $\phi_i$ are quantized to six bits each; and distance $d_i$ is quantized to five bits. In addition, the fingerprint template matching algorithm in accordance with the present invention does not involve computational intensive processes involving for example, floating points, multiplications, and divisions. Instead, the algorithm in accordance with the present invention only uses subtractions. Hence, the algorithm can be executed by a weak microprocessor having very low speed, e.g., between 1 and 10 MegaHertz, such as a microprocessor in a conventional smart card.

Although the invention has been described with reference to particular embodiments, the description is only an example of the invention's application and should not be taken as a limitation. Various other adaptations and combinations of features of the embodiments disclosed are within the scope of the invention as defined by the following claims.

APPENDIX A

```
/* ************************************************************ */
/* ***** Copyright 1999 Veridicom, Inc. All rights reserved. ****** */
/* ************************************************************ */
/* Fast template for matching on a smartcard */
#define FAST_TMPL_NUM_ENTRIES 100
#define FAST_TMPL_NUM_NEIGHS 15
typedef struct fastTemplateEntry_s {
    short minuInfo; /* contains quantized x,y, angle info */
    char neighInfo[FAST_TMPL_NUM_NEIGHS][3];
        /* contains quantized distance, relAngle, relAngDiff info */
} FAST_TEMPLATE_ENTRY;
typedef struct fastTemplateHdr_s {
    char version;
    char numMinu;
} FAST_TEMPLATE_HDR;
typedef struct fastTemplate_s {
    FAST_TEMPLATE_HDR header;
    FAST_TEMPLATE_ENTRY
    constellation[FAST_TMPL_NUM_ENTRIES];
} FAST_TEMPLATE;
#define XDIFF_THRESH 4
#define YDIFF_THRESH 3
#define ANGDIFF_THRESH 7
#define DIST_DIFF 1
```

APPENDIX A-continued

```
#define RELANGLE_DIFF 6
#define RELANGLEDIFF_DIFF 6
char fastMatchConstellationCenter(
    FAST_TEMPLATE_ENTRY *constellationA,
    FAST_TEMPLATE_ENTRY *constellationB );
char fastMatchconstellationNeighs(
    FAST_TEMPLATE_ENTRY *constellationA,
    FAST_TEMPLATE_ENTRY *constellationB,
    char numNeighsB );
long fastMatch(
    FAST_TEMPLATE *templateA,
    FAST_TEMPLATE *templateB )
{
    /* templateA is on smartcard. templateB is from reader. */
    char i, j;
    char score;
    char tmp;
    char numNeighsB;
    score = 0;
    for (i = 0; i < templateB- > header.numMinu; i++)
    {
        /* need to find out how many actual neighbors there are */
        numNeighsB = FAST_TMPL_NUM_NEIGHS;
        for (j = 0; j < FAST_TMPL_NUM_NEIGHS; j++)
        {
            /* calculate once ..,not every time in inner neighbor loop */
            if (templateB- > constellation[i].neighInfo[j][0] == 0 &&
                templateB- > constellation[i].neighInfo[j][1] == 0 &&
                templateB- > constellation[i].neighInfo[j][2] == 0 &&
                j > 6)
            {
                numNeighsB = j;
                break;
            }
        }
        /* ok ... now compare against other template */
        for (j = 0; j < templateA- > header.numMinu; j++)
        {
            tmp = fastMatchConstellationCenter(
                &(templateA- > constellation[j]),
                &(templateB- > constellation[i]) );
            if (tmp == 0) continue;
            else if (tmp < 0) break;
            score + fastMatchconstellationNeighs(
                &(templateA- > constellation[j]),
                &(templateB- > constellation[i]),
                numNeighsB);
        }
        if (score > 25) break;
    }
    return(score);
}
char fastMatchConstellationCenter(
    FAST_TEMPLATE_ENTRY *constellationA,
    FAST_TEMPLATE_ENTRY *constellationB)
{
    char diff, diff2;
    diff = (
        ((char) ((constellationA- > minuInfo&0Xf000) >> 12)) -
        ((char) ((constellationB- > minuInfo&0xf000) >> 12)) );
    if ((diff) > XDIFF_THRESH)
        return( (char) -1); /* due to sort, can stop comparing
            templateB against any more templateA's */
    if ((diff) < -XDIFF_THRESH ) return( (char) 0);
        /* still need to Compare templateB against any more
        templateA's */
    diff2 =
        ((char) ((constellationA- > minuInfo&0x0f00) >> 8)) -
        ((char) ((constellationB- > minuInfo&0X0f00) >> 8));
    if ((diff2) > YDIFF_THRESH && diff == XDIFF_THRESH )
        return( (char) -2);
        /* due to sort, can stop comparing templateB against any
        more templateA's */
    if ((diff2) < -YDIFF_THRESH) return( (char) 0); /* still need to
    compare templateB against any more templateA's */
    diff =
        ((char) ((constellationA- > minuInfo&0x00ff))) -
        ((char) ((constellationB- > minuInfo&0x00ff)));
    rf(diff < 0) diff = -diff;
```

APPENDIX A-continued

```
        if ((diff) > ANGDIFF_THRESH && (diff) < 115 ) return( (char) 0);
        return( (char) 1 );
    }
char fastMatchconstellationNeighs(
    FAST_TEMPLATE_ENTRY *constellationA,
    FAST_TEMPLATE_ENTRY *constellationB,
    char numNeighsB)
{
    char diff;
    char i,j;
    char jstart;
    char *pNeighInfoA, *pNeighInfoB;
    char score;
    /* initial limits to be refined as we go */
    jstart = 0;
    score = 0;
    for (i = 0, pNeighInfoA = constellationA-> neighInfo[0];
        i < FAST_TMPL_NUM_NEIGHS;
        i ++, pNeighInfoA += 3) /* move to next neighbor */
    {
        if (pNeighInfoA[0] = 0 &&
            pNeighInfoA[1] == 0 &&
            pNeighInfoA[2] == 0 &&
            i > 6 ) break;
        for (j = jstart, pNeighInfoB = constellationB-> neighInfo[jstart];
            j < numNeighsB; j ++, pNeighInfoB += 3 /* move to next
            neighbor */)
        {
            diff = pNeighInfoA[0] - pNeighInfoB[0];
            if(diff < 0)
            {
                diff = -diff;
                if (diff > DIST_DIFF) /* if go too far, stop. No
                hope. */
                {
                    if(j > 0) jstart = j-1;
                    break;
                }
            }
            else
            {
                if (diff > DIST_DIFF) /* if go too far, just try next
                one */
                    continue;
            }
            diff = (pNeighInfoA[1] - pNeighInfoB[1]);
            if (diff < 0) diff = -diff;
            if (diff > RELANGLE_DIFF && diff < 120)
            {
                continue;
            }
            diff = (pNeighInfoA[2] - pNeighInfoB[2]);
            if (diff < 0) diff = -diff;
            if (diff > RELANGLEDIFF_DIFF && diff < 120)
            {
                continue;
            }
            score++;
        }
    }
    if (score > 6) score = 1;
    else score = 0;
    return(score);
}
```

I claim:

1. A fingerprint verification system, comprising:
   a smart card reader, said smart card reader comprising:
   a fingerprint sensor; and
   a first microprocessor, said first microprocessor generating a measured template having a plurality of measured data chunks from data read by said fingerprint sensor;
   a smart card, said smart card comprising:
   a static memory, said static memory storing a reference template having a plurality of reference data chunks;
   a second microprocessor, said second microprocessor executing a matching algorithm for determining whether said measured template matches said reference template; and
   a random access memory, said random access memory (RAM) storing only one reference data chunk and only one measured data chunk during execution of said matching algorithm; and
   a communication channel between said smart card and said smart card reader.

2. The system of claim 1, wherein a measured data chunk is loaded into said RAM of said smart card through said communication channel.

3. The system of claim 1, wherein each of said measured data chunks and each of said reference data chunks comprise:
   a location of a minutia;
   a minutia angle of said minutia; and
   a neighborhood of said minutia.

4. The system of claim 3, wherein said location comprises:
   a first coordinate; and
   a second coordinate.

5. The system of claim 4, wherein said first coordinate is quantized.

6. The system of claim 5, wherein said first coordinate is quantized to equal to or less than eight bits.

7. The system of claim 4, wherein said second coordinate is quantized.

8. The system of claim 7, wherein said second coordinate is quantized to equal to or less than eight bits.

9. The system of claim 3, wherein said minutia angle is quantized.

10. The system of claim 9, wherein said minutia angle is quantized to equal to or less than eight bits.

11. The system of claim 3, wherein said neighborhood comprises positional parameters of a plurality of a predetermined number of neighbors.

12. The system of claim 11, wherein said positional parameters comprises:
    a distance between said minutia and a neighbor minutia;
    a first angle between a first coordinate in a direction tangential to a ridge where said minutia is extracted and a line drawn between said minutia and said neighbor minutia; and
    a second angle between said first coordinate and a second coordinate in a direction tangential to a ridge where said neighbor minutia is extracted.

13. The system of claim 12, wherein said distance is quantized.

14. The system of claim 13, wherein said distance is quantized to equal to or less than eight bits.

15. The system of claim 12, wherein said first angle is quantized.

16. The system of claim 15, wherein said first angle is quantized to equal to or less than eight bits.

17. The system of claim 12, wherein said second angle is quantized.

18. The system of claim 17, wherein said second angle is quantized to equal to or less than eight bits.

19. The system of claim 11, wherein said neighbors are sorted.

20. The system of claim 1, wherein said second microprocessor is an 8-bit microprocessor.

21. The system of claim 1, wherein said second microprocessor has a speed between approximately 1 MegaHertz and approximately 10 MegaHertz.

22. The system of claim 1, wherein said RAM is approximately 256 Kilobyte in size.

23. The system of claim 1, wherein said reference data chunks are sorted.

24. The system of claim 1, wherein said measured data chunks are sorted.

* * * * *